United States Patent
Dai et al.

(10) Patent No.: US 12,413,933 B2
(45) Date of Patent: Sep. 9, 2025

(54) SCHEDULED POSITIONING OF TARGET DEVICES USING MOBILE ANCHOR DEVICES

(71) Applicant: QUALCOMM Incorporated, San Diego, CA (US)

(72) Inventors: Yucheng Dai, San Diego, CA (US); Sony Akkarakaran, Poway, CA (US); Jingchao Bao, San Diego, CA (US); Wooseok Nam, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 437 days.

(21) Appl. No.: 17/660,769

(22) Filed: Apr. 26, 2022

(65) Prior Publication Data

US 2023/0345204 A1    Oct. 26, 2023

(51) Int. Cl.
*H04W 4/029* (2018.01)
*G01S 5/00* (2006.01)
*G01S 5/02* (2010.01)

(52) U.S. Cl.
CPC .......... *H04W 4/029* (2018.02); *G01S 5/0072* (2013.01); *G01S 5/0249* (2020.05); *G01S 5/0289* (2013.01)

(58) Field of Classification Search
CPC ....... H04W 4/02; H04W 4/021; H04W 4/023; H04W 4/025
USPC ................................................... 455/456.1
See application file for complete search history.

(56) References Cited

U.S. PATENT DOCUMENTS

| | | |
|---|---|---|
| 11,405,740 B1 * | 8/2022 | Berol ...................... H04S 7/301 |
| 2005/0135319 A1 * | 6/2005 | Shi .......................... G01S 5/0289 370/349 |
| 2008/0318596 A1 | 12/2008 | Tenny |
| 2011/0059752 A1 | 3/2011 | Garin et al. |
| 2014/0274141 A1 * | 9/2014 | Gholmieh ............... H04W 4/02 455/456.3 |
| 2019/0180229 A1 * | 6/2019 | Phillips .............. G06Q 10/0833 |
| 2019/0242989 A1 * | 8/2019 | Lee ........................ G01S 5/0289 |
| 2020/0097028 A1 * | 3/2020 | Axmon ................... H04L 67/52 |
| 2020/0275462 A1 * | 8/2020 | Liu ...................... H04W 72/569 |
| 2020/0358608 A1 * | 11/2020 | Stanton ................. H04L 9/0819 |
| 2020/0374488 A1 * | 11/2020 | Boyce .................... H04N 7/147 |
| 2021/0168715 A1 * | 6/2021 | Huang ................. H04W 24/08 |
| 2021/0219329 A1 * | 7/2021 | Zhou ....................... H04L 1/189 |
| 2021/0377697 A1 | 12/2021 | Yerramalli et al. |
| 2022/0030543 A1 | 1/2022 | Yerramalli |

(Continued)

OTHER PUBLICATIONS

International Search Report and Written Opinion—PCT/US2023/017565—ISA/EPO—Aug. 14, 2023.

*Primary Examiner* — Jean A Gelin
(74) *Attorney, Agent, or Firm* — QUALCOMM Incorporated

(57) ABSTRACT

In an aspect, a location server may receive a request to determine a position of a first mobile device at a first scheduled time. The location server may determine a first position of a second mobile device during a first time window before the first scheduled time. The location server may configure the second mobile device to perform positioning operations during a second time window corresponding to the first scheduled time to assist in the determination of the position of the first mobile device at the first scheduled time.

15 Claims, 22 Drawing Sheets

(56) References Cited

U.S. PATENT DOCUMENTS

| | | | |
|---|---|---|---|
| 2022/0058583 A1* | 2/2022 | Thompson | G06Q 10/1095 |
| 2022/0095348 A1* | 3/2022 | Zhao | H04W 4/023 |
| 2022/0119095 A1* | 4/2022 | Tsang | G01M 1/16 |
| 2022/0173829 A1* | 6/2022 | Huang | H04L 5/0082 |
| 2022/0272717 A1* | 8/2022 | Chen | H04W 72/20 |
| 2022/0322272 A1* | 10/2022 | Akkarakaran | H04W 24/10 |
| 2022/0329976 A1* | 10/2022 | He | H04W 4/023 |
| 2023/0142084 A1* | 5/2023 | Cha | H04L 5/0057 |
| | | | 455/456.1 |
| 2023/0232370 A1* | 7/2023 | Yang | H04L 5/0069 |
| | | | 370/329 |
| 2023/0264686 A1* | 8/2023 | Van Wiemeersch | B60W 30/06 |
| | | | 701/2 |
| 2023/0333194 A1* | 10/2023 | Duan | G01S 5/0072 |
| 2023/0333198 A1* | 10/2023 | Thompson | G01S 5/02524 |
| 2023/0345206 A1* | 10/2023 | Beale | H04W 4/029 |
| 2023/0354246 A1* | 11/2023 | Cao | H04L 5/0051 |
| 2023/0362874 A1* | 11/2023 | Wang | H04W 64/00 |
| 2023/0366974 A1* | 11/2023 | Vejlgaard | G01S 5/0289 |
| 2023/0388959 A1* | 11/2023 | Hasegawa | G01S 5/0036 |
| 2024/0023050 A1* | 1/2024 | Zhao | H04W 4/44 |
| 2024/0080813 A1* | 3/2024 | Xue | H04L 5/0053 |
| 2024/0137900 A1* | 4/2024 | Li | G01S 5/0284 |

\* cited by examiner

SCHEDULED POSITIONING OF TARGET DEVICES USING MOBILE ANCHOR DEVICES

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a location server includes receiving a request to determine a position of a first mobile device at a first scheduled time; determining a first position of a second mobile device during a first time window; and configuring the second mobile device to perform positioning operations during a second time window corresponding to the first scheduled time to assist in a determination of the position of the first mobile device at the first scheduled time.

In an aspect, a method of wireless communication performed by a location server includes determining a first set of positions for one or more second mobile devices based on geometric dilution of precision (GDOP) considerations for determining a position of a first mobile device; determining whether at least one second mobile device is within a threshold distance of at least one position of the first set of positions; and in response to determining that the at least one second mobile device is within the threshold distance of the at least one position of the first set of positions, configuring the at least one second mobile device to perform positioning operations to determine the position of the first mobile device while the at least one second mobile device is within the threshold distance of the at least one position of the first set of positions.

In an aspect, a method of wireless communication performed by a location server includes determining to perform a wireless sensing operation at a first scheduled time to determine a location of a target object; determining a first position of a mobile device during a first time window; and configuring the mobile device to transmit wireless sensing signals during a second time window corresponding to the first scheduled time to assist in the determination of the location of the target object at the first scheduled time.

In an aspect, a location server includes a memory; at least one transceiver; and at least one processor communicatively coupled to the memory and the at least one transceiver, the at least one processor configured to: receive, via the at least one transceiver, a request to determine a position of a first mobile device at a first scheduled time; determine a first position of a second mobile device during a first time window; and configure the second mobile device to perform positioning operations during a second time window corresponding to the first scheduled time to assist in a determination of the position of the first mobile device at the first scheduled time.

In an aspect, a location server includes a memory; at least one transceiver; and at least one processor communicatively coupled to the memory and the at least one transceiver, the at least one processor configured to: determine a first set of positions for one or more second mobile devices based on geometric dilution of precision (GDOP) considerations for determining a position of a first mobile device; determine whether at least one second mobile device is within a threshold distance of at least one position of the first set of positions; and in response to a determination that the at least one second mobile device is within the threshold distance of the at least one position of the first set of positions, configure the at least one second mobile device to perform positioning operations to determine the position of the first mobile device while the at least one second mobile device is within the threshold distance of the at least one position of the first set of positions.

In an aspect, a location server includes a memory; at least one transceiver; and at least one processor communicatively coupled to the memory and the at least one transceiver, the at least one processor configured to: determine to perform a wireless sensing operation at a first scheduled time to determine a location of a target object; determine a first position of a mobile device during a first time window; and configure the mobile device to transmit wireless sensing signals during a second time window corresponding to the first scheduled time to assist in the determination of the location of the target object at the first scheduled time.

In an aspect, a location server includes means for receiving a request to determine a position of a first mobile device at a first scheduled time; means for determining a first position of a second mobile device during a first time window; and means for configuring the second mobile device to perform positioning operations during a second time window corresponding to the first scheduled time to assist in a determination of the position of the first mobile device at the first scheduled time.

In an aspect, a location server includes means for determining a first set of positions for one or more second mobile devices based on geometric dilution of precision (GDOP) considerations for determining a position of a first mobile device; means for determining whether at least one second mobile device is within a threshold distance of at least one position of the first set of positions; and means for configuring the at least one second mobile device to perform positioning operations to determine the position of the first mobile device while the at least one second mobile device is within the threshold distance of the at least one position of the first set of positions.

In an aspect, a location server includes means for determining to perform a wireless sensing operation at a first scheduled time to determine a location of a target object; means for determining a first position of a mobile device during a first time window; and means for configuring the mobile device to transmit wireless sensing signals during a second time window corresponding to the first scheduled time to assist in the determination of the location of the target object at the first scheduled time.

In an aspect, a non-transitory computer-readable medium stores computer-executable instructions that, when executed by a location server, cause the location server to: receive a request to determine a position of a first mobile device at a first scheduled time; determine a first position of a second mobile device during a first time window; and configure the second mobile device to perform positioning operations during a second time window corresponding to the first scheduled time to assist in a determination of the position of the first mobile device at the first scheduled time.

In an aspect, a non-transitory computer-readable medium stores computer-executable instructions that, when executed by a location server, cause the location server to: determine a first set of positions for one or more second mobile devices based on geometric dilution of precision (GDOP) considerations for determining a position of a first mobile device; determine whether at least one second mobile device is within a threshold distance of at least one position of the first set of positions; and in response to determining that the at least one second mobile device is within the threshold distance of the at least one position of the first set of positions, configure the at least one second mobile device to perform positioning operations to determine the position of the first mobile device while the at least one second mobile device is within the threshold distance of the at least one position of the first set of positions.

In an aspect, a non-transitory computer-readable medium stores computer-executable instructions that, when executed by a location server, cause the location server to: determine to perform a wireless sensing operation at a first scheduled time to determine a location of a target object; determine a first position of a mobile device during a first time window; and configure the mobile device to transmit wireless sensing signals during a second time window corresponding to the first scheduled time to assist in the determination of the location of the target object at the first scheduled time.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
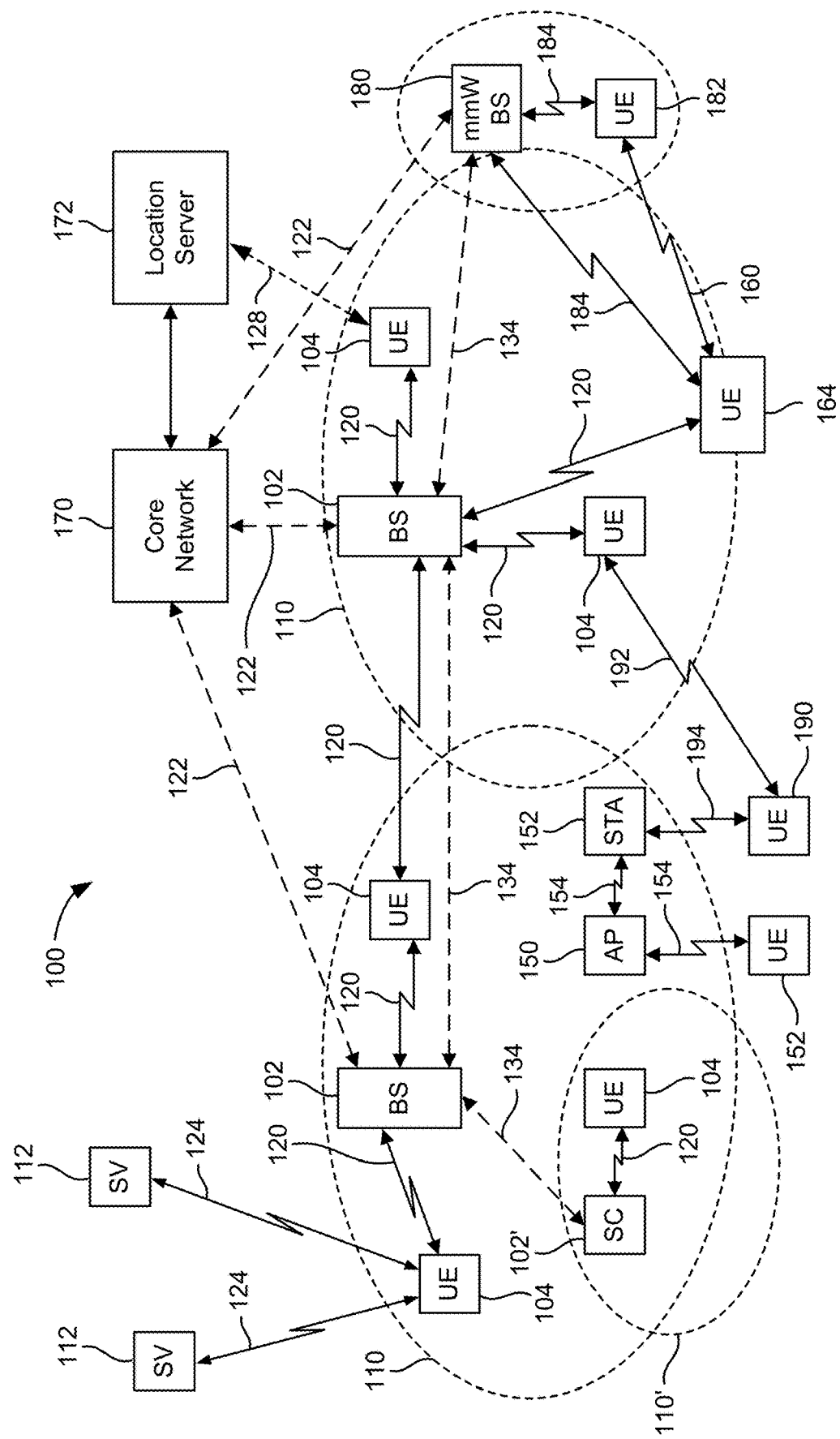
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more S Cells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
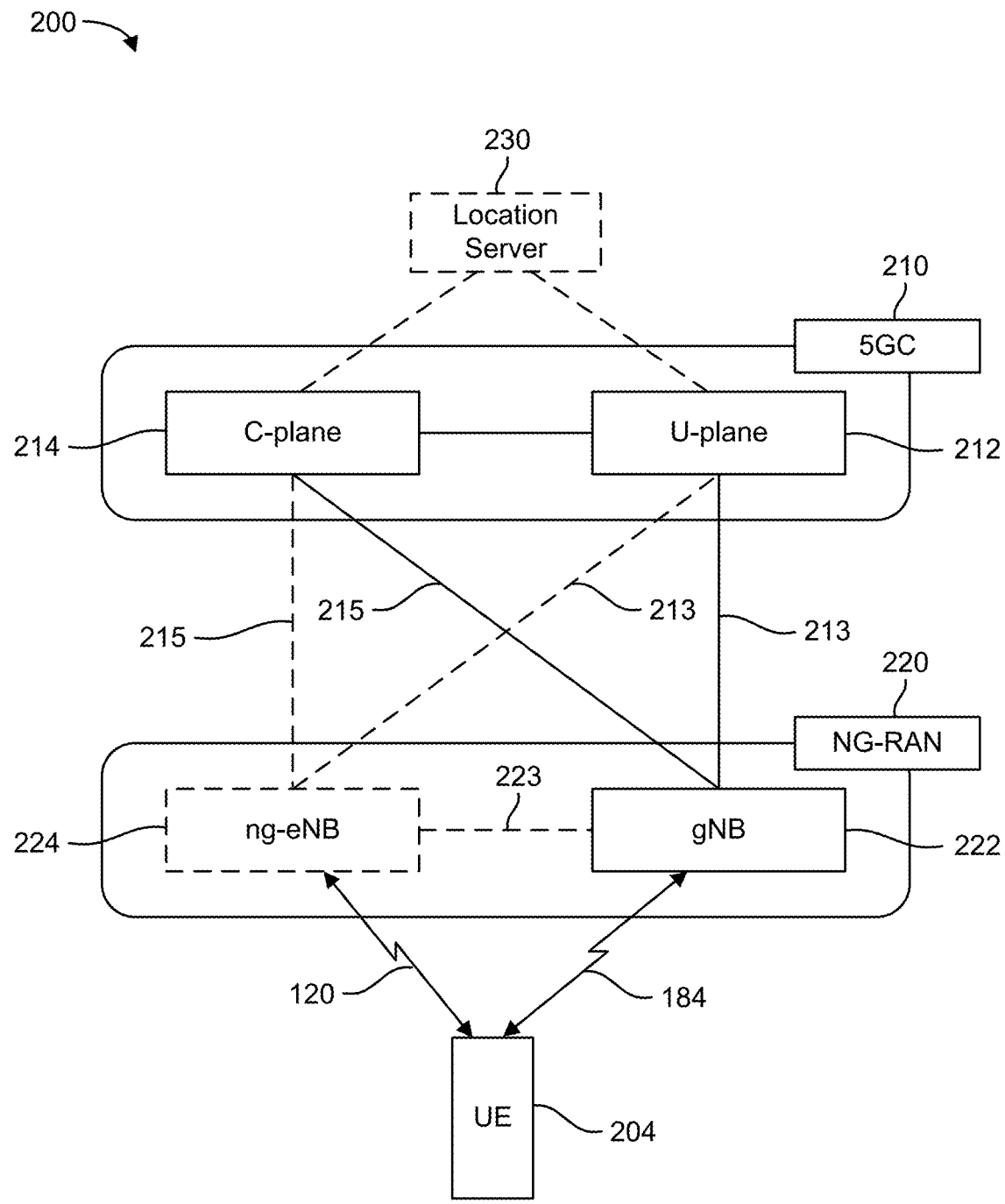
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
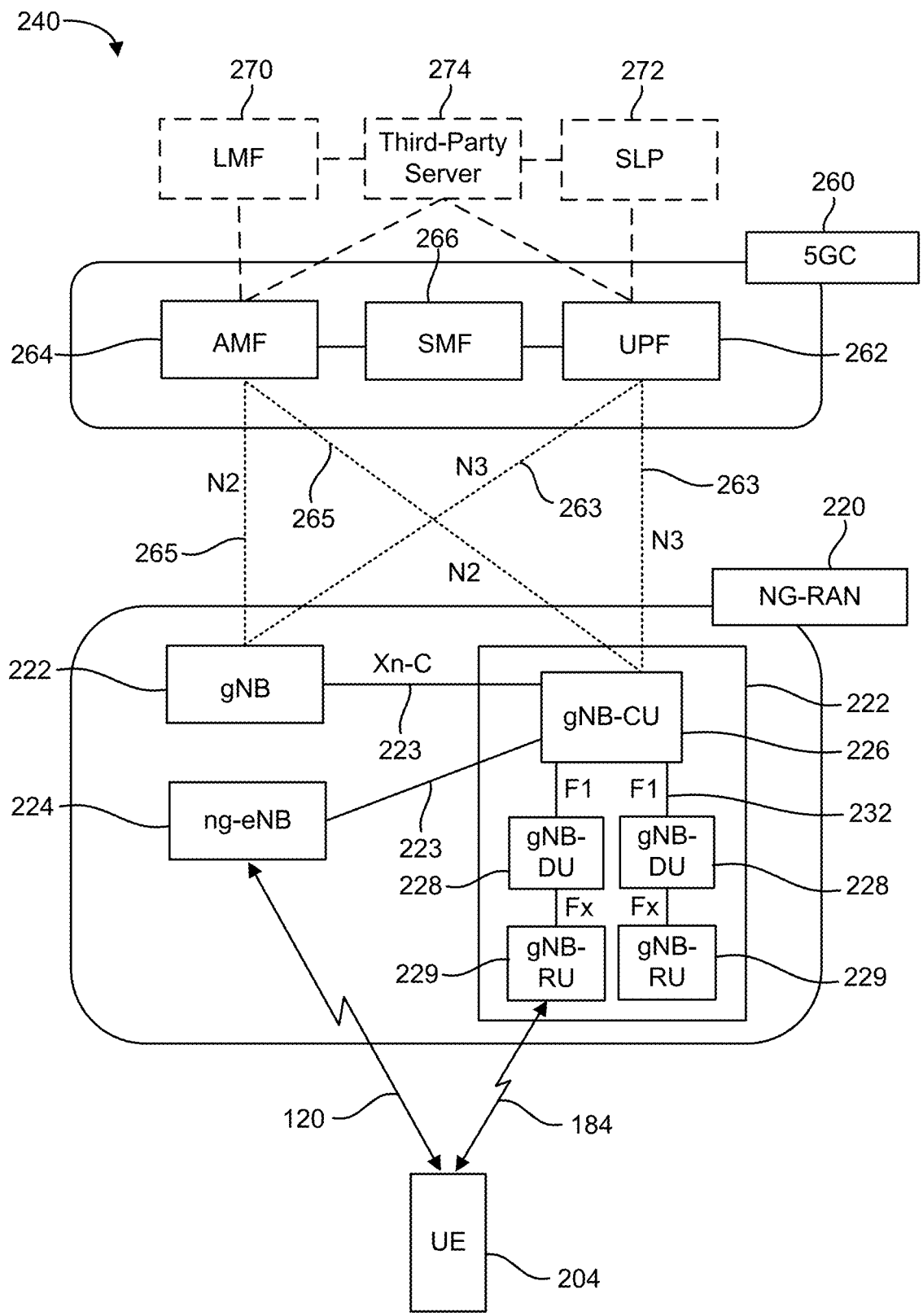

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
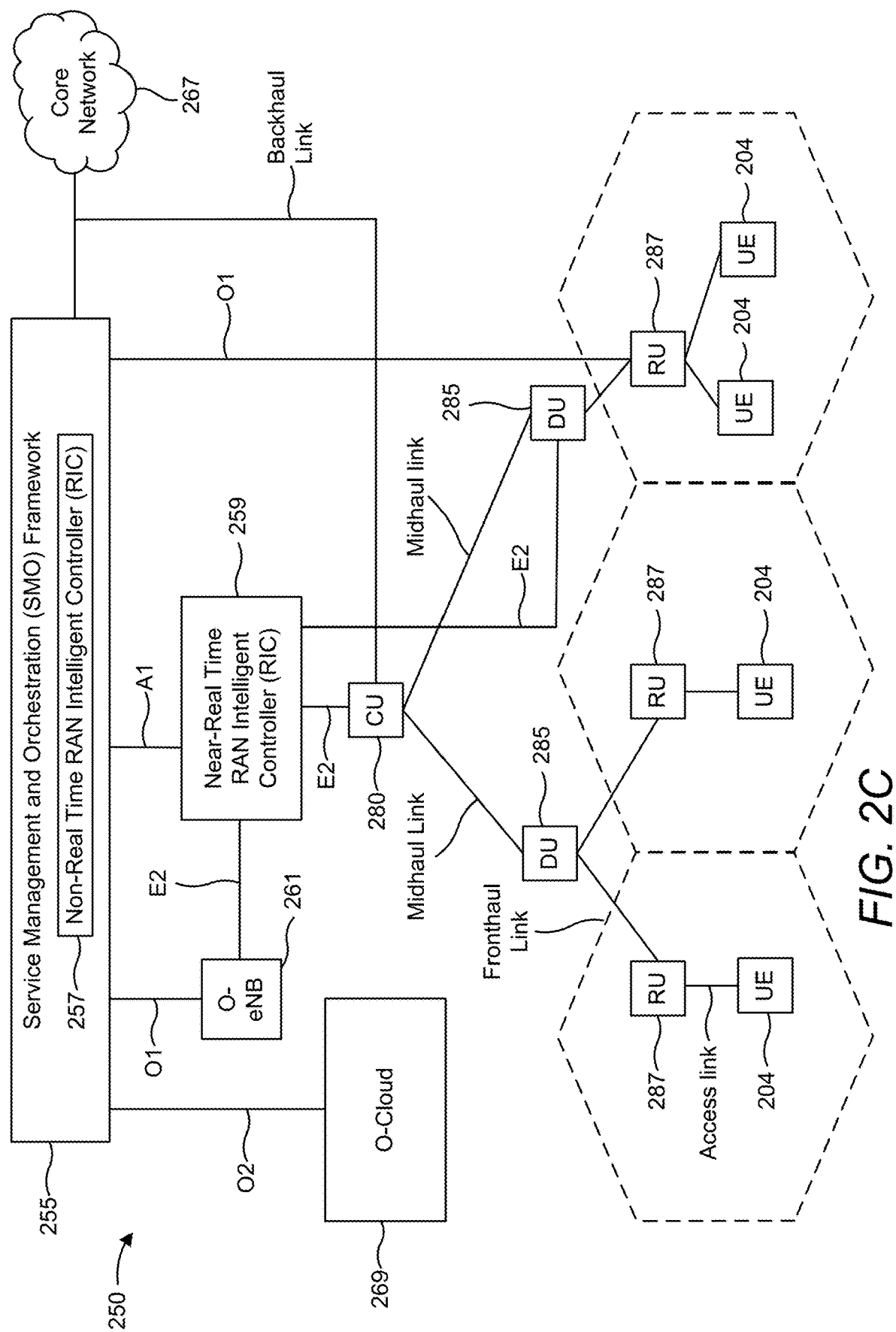

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more distributed units (DUs) 285 (e.g., gNB-DUs 228) via respective midhaul links, such as an F1 interface. The DUs 285 may communicate with one or more radio units (RUs) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUs 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 280 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 280. The CU 280 may be configured to handle user plane functionality (i.e., Central-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via O1) or via creation of RAN management policies (such as A1 policies).

Figure 3A:
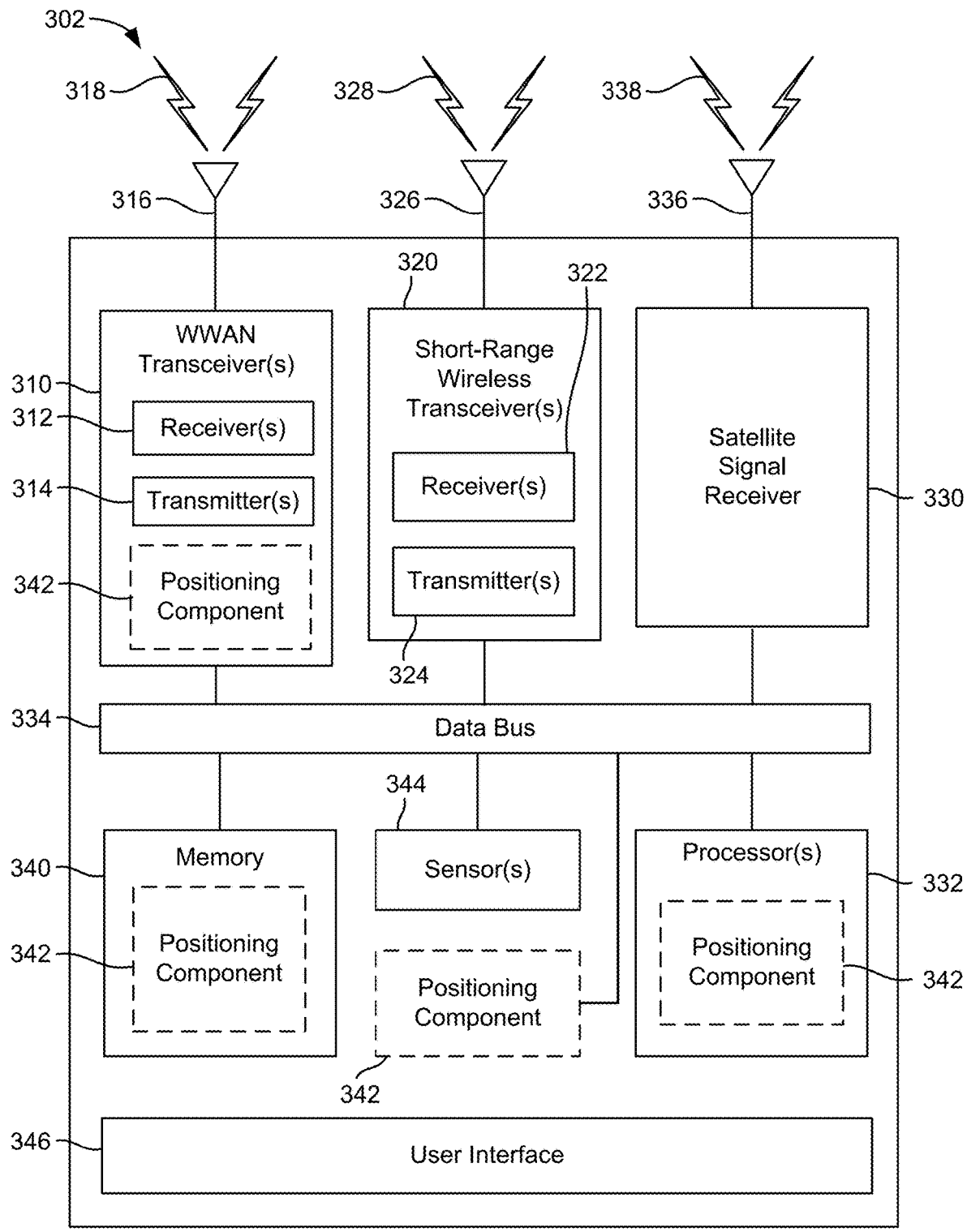
FIGS. 3A, 3B, and 3C are simplified block diagrams of several sample aspects of components that may be employed in a user equipment (UE), a base station, and a network entity, respectively, and configured to support communications as taught herein.
Figure 3B:
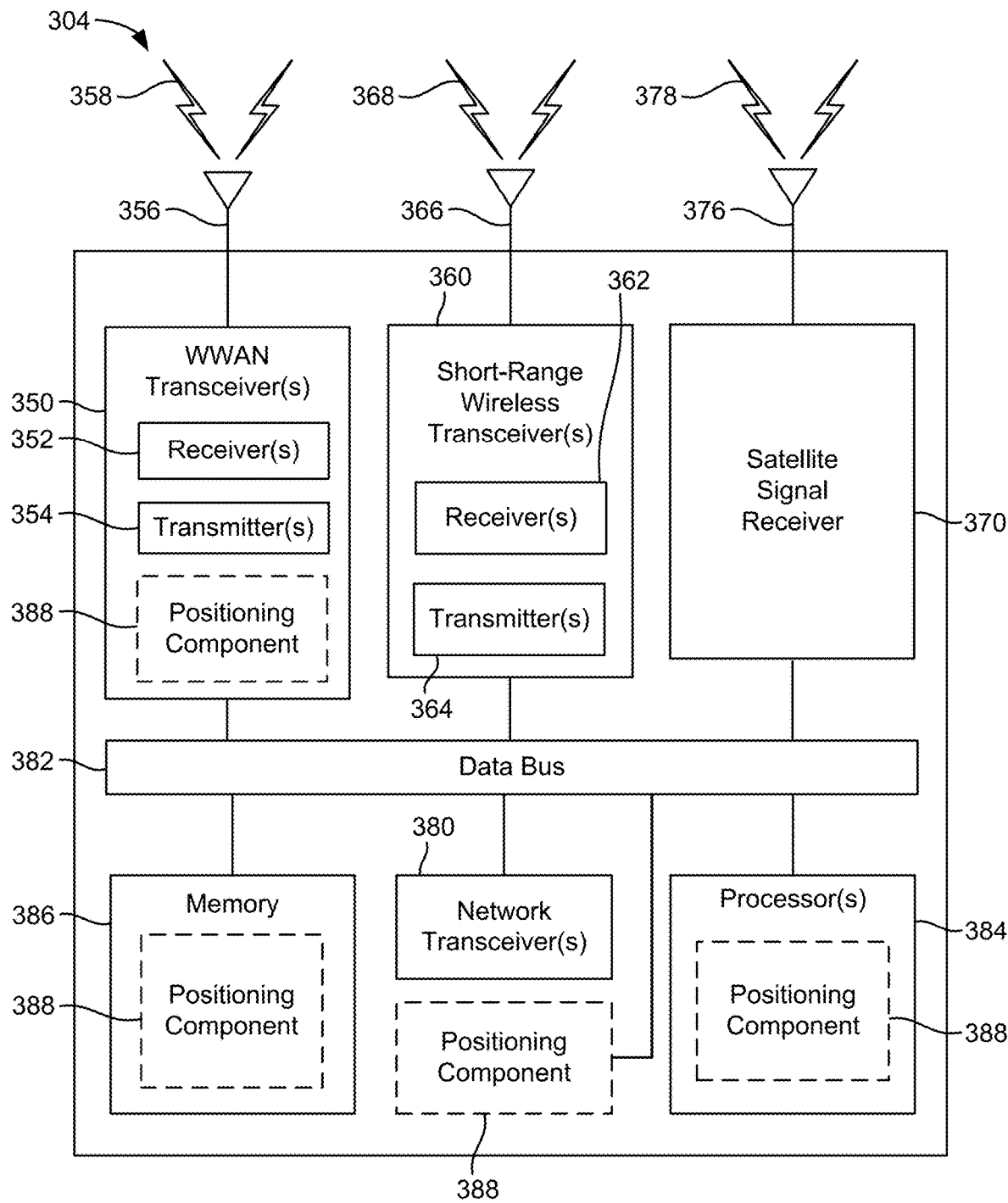
Figure 3C:
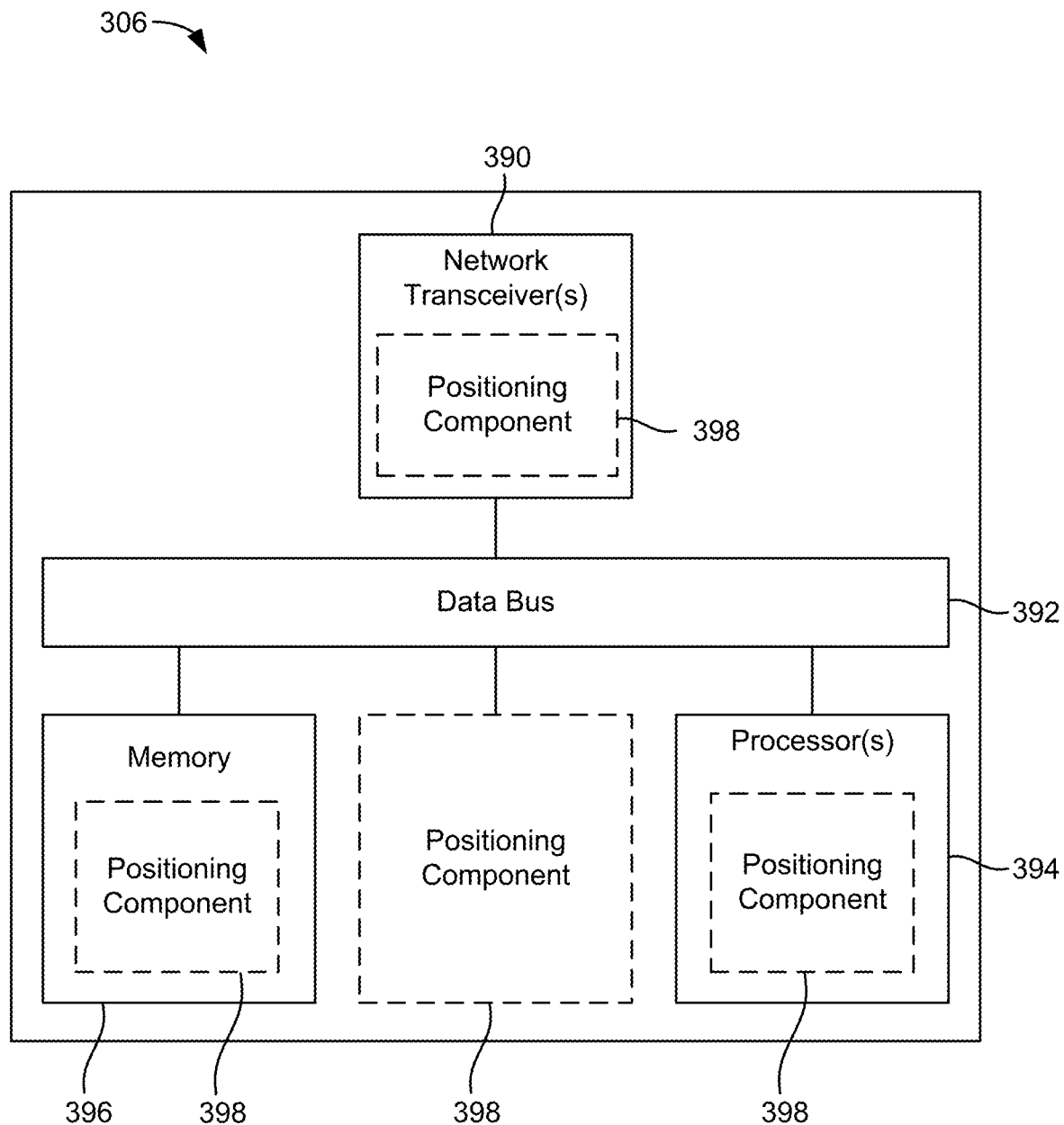

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
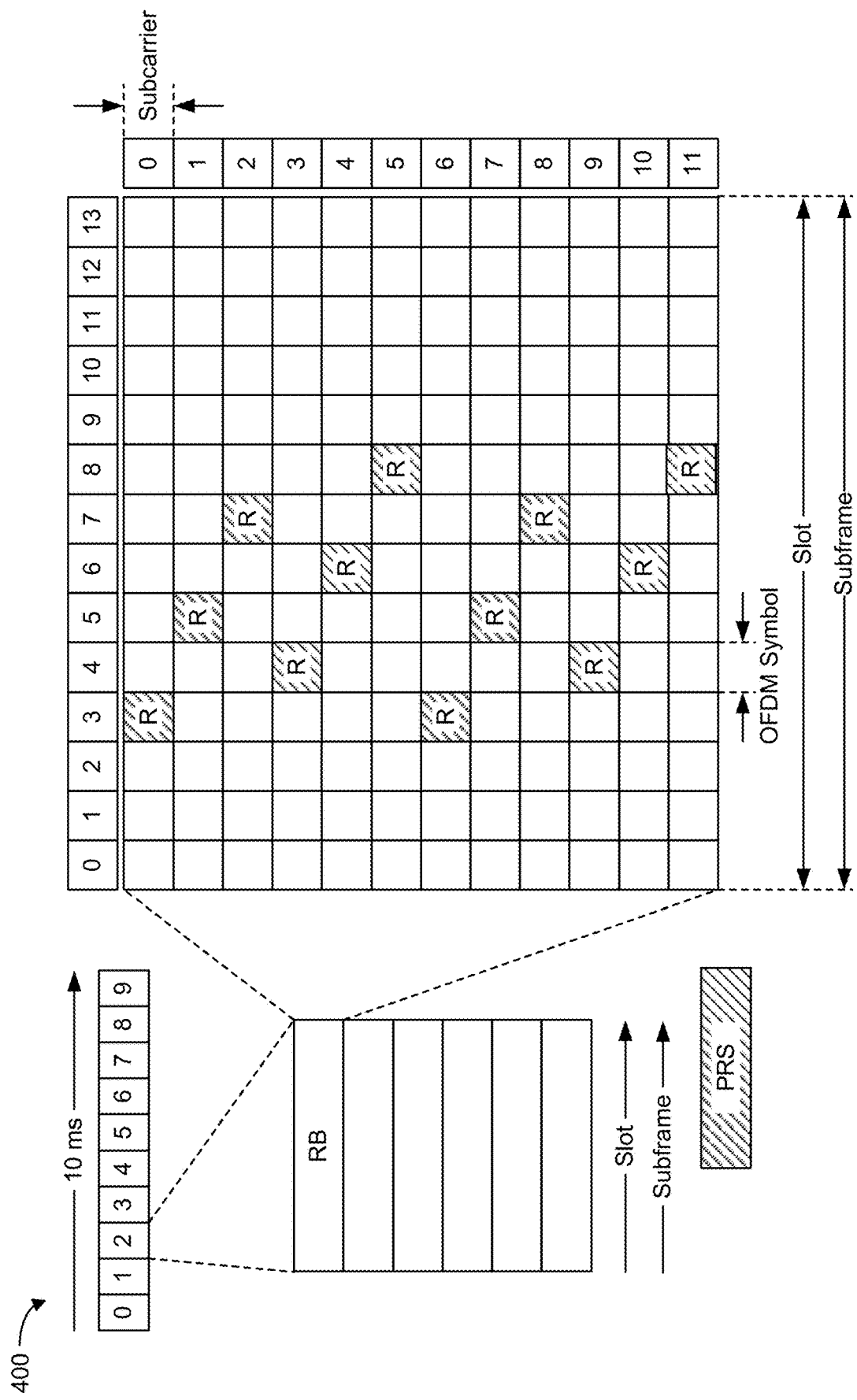
FIG. 4 is a diagram illustrating an example of a downlink frame structure, according to aspects of the disclosure.

Various frame structures may be used to support downlink and uplink transmissions between network nodes (e.g., base stations and UEs). FIG. 4 is a diagram 400 illustrating an example of a downlink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu$=2), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu$=4), there are 16 slots per subframe, 160 slots per frame, the slot duration is 0.0625 ms, the symbol duration is 4.17 $\mu$s, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), etc. FIG. 4 illustrates example locations of REs carrying PRS (labeled "R").

A collection of resource elements (REs) that are used for transmission of PRS is referred to as a "PRS resource." The collection of resource elements can span multiple PRBs in the frequency domain and N (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size N represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4 illustrates an example PRS resource configuration for comb-6 (which spans six symbols). That is, the locations of the shaded REs (labeled "R") indicate a comb-6 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3}; 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu*\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS for positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known positions of the involved base stations and the RSTD measurements, the positioning entity (e.g., the UE for UE-based positioning or a location server for UE-assisted positioning) can estimate the UE's location.

For DL-AoD positioning, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known position(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known positions of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known position(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, a first entity (e.g., a UE or base station) performs an RTT positioning procedure with multiple second entities (e.g., multiple base stations or UEs) to enable the location of the first entity to be determined (e.g., using multilateration) based on distances to, and the known positions of, the second entities. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known positions of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known position or defined in absolute terms (e.g., using latitude, longitude, and possibly altitude). A location estimate may include an expected error or uncertainty (e.g., by including an area or volume within which the location is expected to be included with some specified or default level of confidence).

The quality of a location estimate that can be obtained from a group of transmitters (e.g., base stations, WLAN APs, Global Navigation Satellite System (GNSS) satellites, positioning beacons, etc.) can be quantified using a metric referred to as dilution of precision (DOP). DOP is a well-known metric that represents the effect on the precision of positioning measurements due to the geometry of the transmitters relative to the target UE. The computation of a DOP metric uses the known positions of the transmitters and at least a coarse location of the UE.

More specifically, the wireless signals from a transmitter generally have a fixed precision. Therefore, the relative transmitter-receiver geometry plays a significant role in determining the precision of the estimated location of the receiver. Due to the relative geometry of any given transmitter to the receiver, the precision of the transmitted signal translates to a corresponding component in each of the three dimensions of location measured by the receiver (i.e., x, y, z). The precision of multiple transmitters in view of a receiver combine according to the relative location of the transmitters to determine the level of precision in each dimension of the receiver measurements. When the transmitters are close together from the perspective of the receiver (e.g., multiple transmitters may be spatially separated but appear in a line from the perspective of the receiver), the geometry is said to be weak and the DOP value is high. When the transmitters are far apart from the perspective of the receiver, the geometry is strong and the DOP value is low. Thus, a low DOP value represents better location precision due to the wider angular separation between the transmitters used to calculate the receiver's location. Other factors that can increase the effective DOP are obstructions such as nearby mountains or buildings.

There are several variants of DOP, including geometric dilution of precision (GDOP), horizontal dilution of precision (HDOP), vertical dilution of precision (VDOP), position (3D) dilution of precision (PDOP), and time dilution of precision (TDOP). GDOP is used to represent both 3D positioning and timing uncertainty, whereas PDOP is used to represent 3D positioning uncertainty only and TDOP is used to represent the timing uncertainty only. VDOP is used to represent vertical positioning uncertainty.

Figure 5:
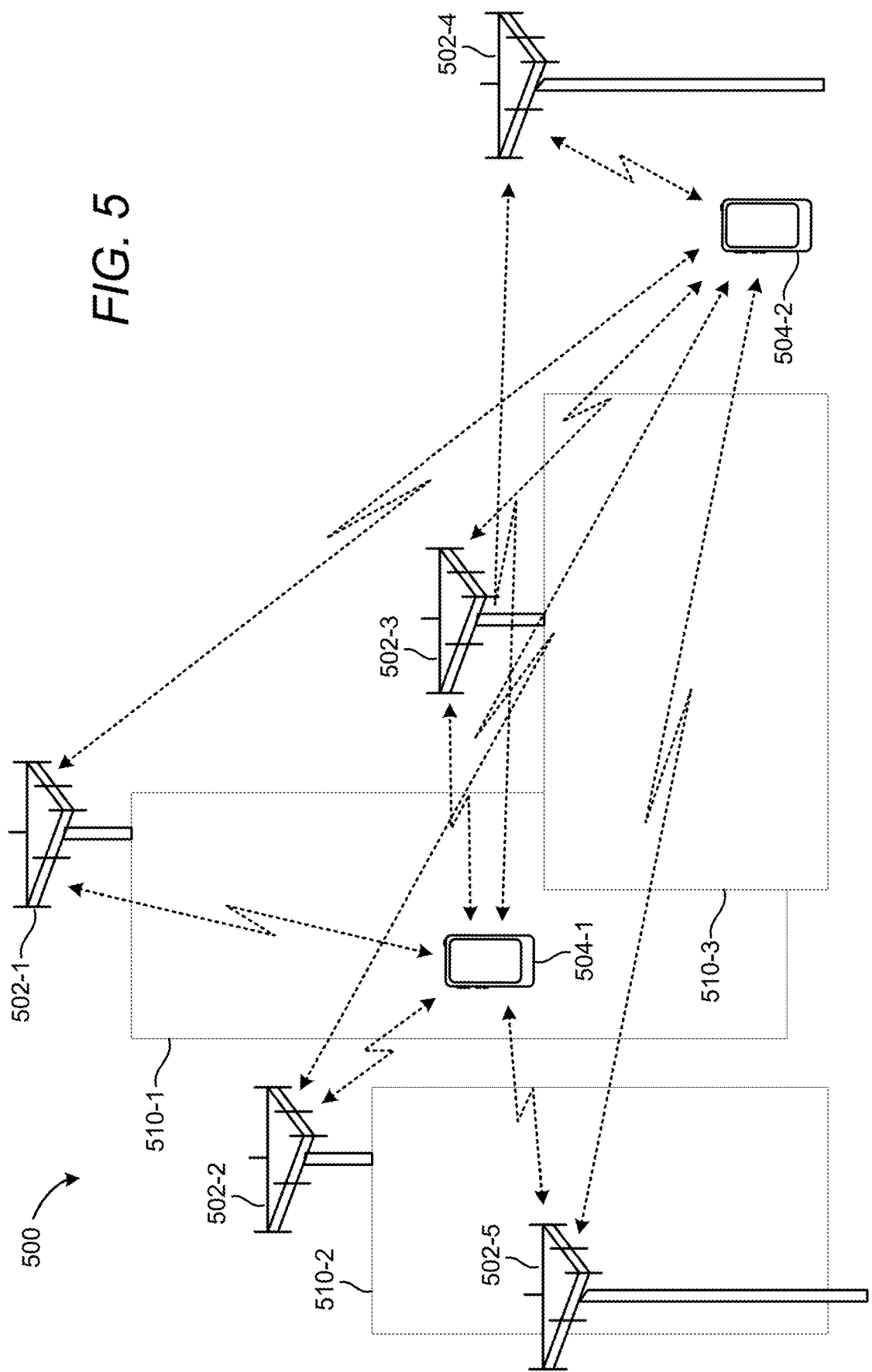
FIG. 5 illustrates an example wireless communication network in which a plurality of UEs may receive positioning reference signals (PRS) from a plurality of base stations, according to aspects of the disclosure.

As described above, a good (i.e., low) DOP value is typically tied to the spatial distribution of the transmitters relative to the target UE and the measurement uncertainty (which may be based on the link quality) for each link between the UE and the respective transmitter. FIG. 5 illustrates an example wireless communication network 500 in which a plurality of UEs may receive PRS from a plurality of base stations, according to aspects of the disclosure. Specifically, a first UE 504-1 and a second UE 504-2 (collectively, UEs 504) may be able to detect and process PRS transmitted by base stations 502-1, 502-2, 502-3, 502-4, and 502-5 (collectively, base stations 502). In an aspect, the base stations 502 may transmit PRS periodically or on-demand (e.g., when directed by a location server or requested by a UE 504) to enable UEs 504 in their coverage area to measure properties of those PRS (e.g., ToA, RSTD, Rx-Tx time difference, AoA, etc.) for positioning purposes. As will be appreciated, although FIG. 5 illustrates two UEs 504 and five base stations 502, there may be more or fewer than two UEs 504 and five base stations 502.

In the example of FIG. 5, the subset of base stations 502-1, 502-2, 502-3, and 502-5 would likely provide a good (or at least sufficient) DOP for UE 504-1, while the subset of base stations 502-3, 502-4, and 502-5 would likely provide a good (or at least sufficient) DOP for UE 504-2. Measuring PRS from a base station 502 whose location is highly "correlated" (i.e., has low spatial distribution) with other base stations 502 from the perspective of a UE 504 is unlikely to improve the positioning quality for the UE 504. Thus, for UE 504-1, because base station 502-4 is substantially in line with base station 502-3 from the perspective of the UE 504-1, adding base station 502-4 to the set of base stations 502 the UE 504-1 is measuring would be unlikely to improve, at least significantly, the location estimate for UE 504-1. Similarly, for UE 504-2, because base stations 502-1 and 502-2 are substantially in line with base station 502-3 from the perspective of the UE 504-2, adding base stations 502-1 and 502-2 to the set of base stations 502 the UE 504-2 is measuring would be unlikely to improve, at least significantly, the location estimate for UE 504-2. Note that references to "measuring a base station" more specifically refers to measuring PRS from that base station.

Where a UE 504 can measure strong signals from several base stations 502 (five in the example of FIG. 5), such as in a dense network deployment, a target UE 504 may not need to process the PRS from all available base stations 502 in order to estimate, or enable the estimation of, its location. Rather, it may be sufficient to select a subset of base stations 502 that satisfy a quality metric (e.g., a DOP threshold). Thus, since the set of base stations 502-1, 502-2, 502-3, and 502-5 provide a good DOP for UE 504-1, the UE 504-1 can measure PRS from only these base stations 502 to compute, or enable another positioning entity to compute, its location. Similarly, since the set of base stations 502-3, 502-4, and 502-5 provide a good DOP for UE 504-2, the UE 504-2 can measure PRS from only these base stations 502 to compute, or enable another positioning entity to compute, its location.

Figure 6:
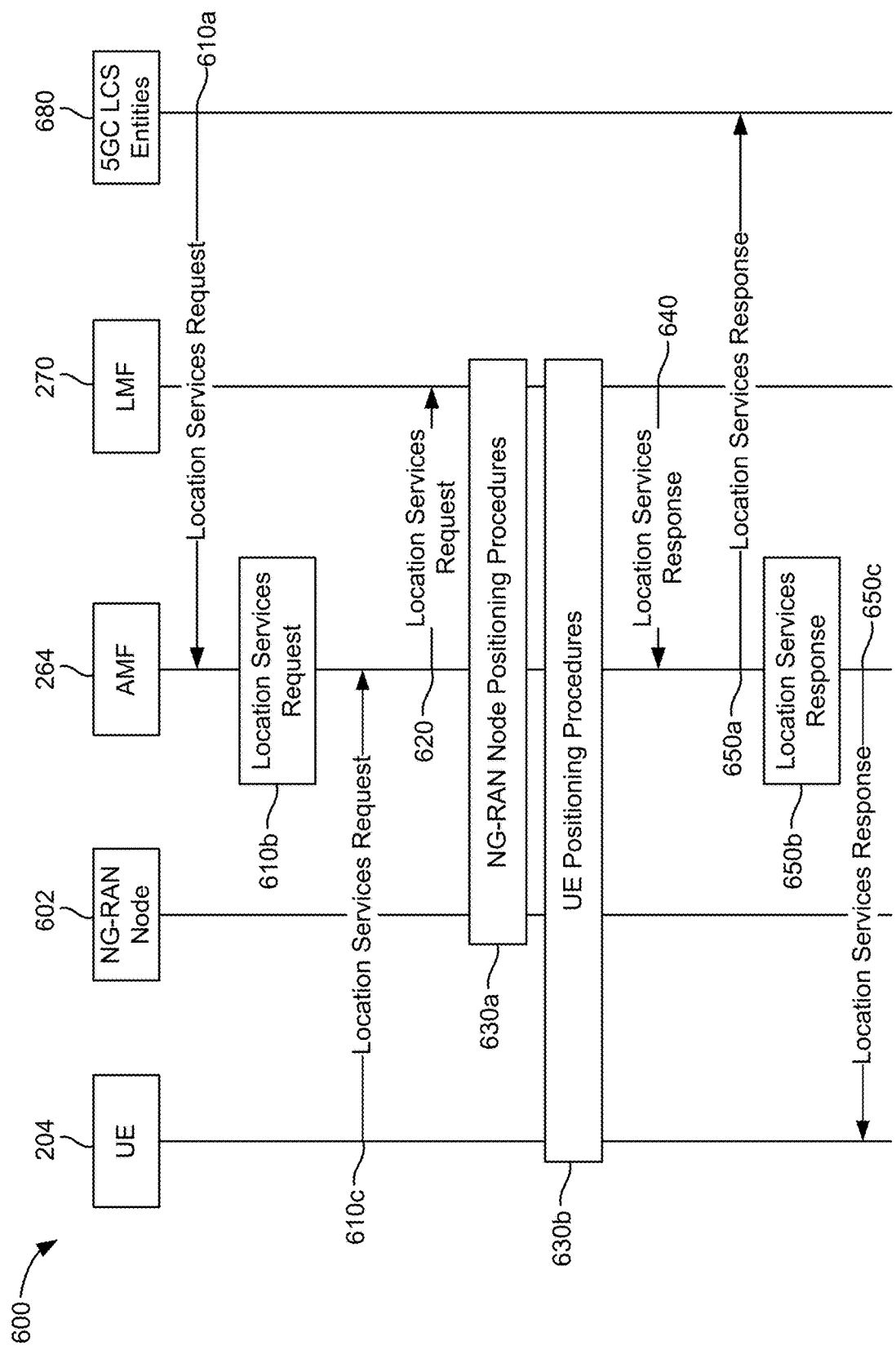
FIG. 6 illustrates an example UE positioning operation, according to aspects of the disclosure.

FIG. 6 illustrates an example UE positioning operation 600, according to aspects of the disclosure. The UE positioning operation 600 may be performed by a UE 204, an NG-RAN node 602 (e.g., gNB 222, gNB-CU 226, ng-eNB 224, or other node in the NG-RAN 220) in the NG-RAN 220, an AMF 264, an LMF 270, and a 5GC location services (LCS) entity 680 (e.g., any third-party application requesting the UE's 204 location, a public service access point (PSAP), an E-911 server, etc.).

A location services request to obtain the location of a target (i.e., UE 204) may be initiated by a 5GC LCS entity 680, the AMF 264 serving the UE 204, or the UE 204 itself. FIG. 6 illustrates these options as stages 610a, 610b, and 610c, respectively. Specifically, at stage 610a, a 5GC LCS entity 680 sends a location services request to the AMF 264. Alternatively, at stage 610b, the AMF 264 generates a location services request itself. Alternatively, at stage 610c, the UE 204 sends a location services request to the AMF 264.

Once the AMF 264 has received (or generated) a location services request, it forwards the location services request to the LMF 270 at stage 620. The LMF 270 then performs NG-RAN positioning procedures with the NG-RAN node 602 at stage 630a and UE positioning procedures with the UE 204 at stage 630b. The specific NG-RAN positioning procedures and UE positioning procedures may depend on the type(s) of positioning method(s) used to locate the UE 204, which may depend on the capabilities of the UE 204. The positioning method(s) may be downlink-based (e.g., LTE-OTDOA, DL-TDOA, DL-AoD, etc.), uplink-based (e.g., UL-TDOA, UL-AoA, etc.), and/or downlink-and-uplink-based (e.g., LTE/NR E-CID, multi-RTT, etc.), as described above. Corresponding positioning procedures are described in detail in 3GPP Technical Specification (TS) 38.305, which is publicly available and incorporated by reference herein in its entirety.

The NG-RAN positioning procedures and UE positioning procedures may utilize LTE positioning protocol (LPP) signaling between the UE 204 and the LMF 270 and LPP type A (LPPa) or New Radio positioning protocol type A (NRPPa) signaling between the NG-RAN node 602 and the LMF 270. LPP is used point-to-point between a location server (e.g., LMF 270) and a UE (e.g., UE 204) in order to obtain location-related measurements or a location estimate or to transfer assistance data. A single LPP session is used to support a single location request (e.g., for a single mobile-terminated location request (MT-LR), mobile-originated location request (MO-LR), or network induced location request (NI-LR)). Multiple LPP sessions can be used between the same endpoints to support multiple different location requests. Each LPP session comprises one or more LPP transactions, with each LPP transaction performing a single operation (e.g., capability exchange, assistance data transfer, location information transfer). LPP transactions are referred to as LPP procedures.

A prerequisite for stage 630 is that an LCS Correlation identifier (ID) and an AMF ID has been passed to the LMF 270 by the serving AMF 264. Both, the LCS Correlation ID and the AMF ID may be represented as a string of characters selected by the AMF 264. The LCS Correlation ID and the AMF ID are provided by the AMF 264 to the LMF 270 in the location services request at stage 620. When the LMF 270 then instigates stage 630, the LMF 270 also includes the LCS Correlation ID for this location session, together with the AMF ID, which indicates the AMF instance serving the UE 204. The LCS Correlation ID is used to ensure that during a positioning session between the LMF 270 and the UE 204, positioning response messages from the UE 204 are returned by the AMF 264 to the correct LMF 270 and carrying an indication (the LCS Correlation ID) that can be recognized by the LMF 270.

Note that the LCS Correlation ID serves as a location session identifier that may be used to identify messages exchanged between the AMF 264 and the LMF 270 for a particular location session for a UE 204, as described in greater detail in 3GPP TS 23.273, which is publicly available and incorporated by reference herein in its entirety. As mentioned above and shown in stage 620, a location session between an AMF 264 and an LMF 270 for a particular UE 204 is instigated by the AMF 264, and the LCS Correlation ID may be used to identify this location session (e.g., may be used by the AMF 264 to identify state information for this location session, etc.).

LPP positioning methods and associated signaling content are defined in the 3GPP LPP standard (3GPP TS 37.355, which is publicly available and incorporated by reference herein in its entirety). LPP signaling can be used to request and report measurements related to the following positioning methods: LTE-OTDOA, DL-TDOA, A-GNSS, E-CID, sensor, TBS, WLAN, Bluetooth, DL-AoD, UL-AoA, and multi-RTT. Currently, LPP measurement reports may contain the following measurements: (1) one or more ToA, TDOA, RSTD, or Rx-Tx time difference measurements, (2) one or more AoA and/or AoD measurements (currently only for a base station to report UL-AoA and DL-AoD to the LMF 270), (3) one or more multipath measurements (per-path ToA, RSRP, AoA/AoD), (4) one or more motion states (e.g., walking, driving, etc.) and trajectories (currently only for the UE 204), and (5) one or more report quality indications.

As part of the NG-RAN node positioning procedures (stage 630*a*) and UE positioning procedures (stage 630*b*), the LMF 270 may provide LPP assistance data in the form of downlink positioning reference signal (DL-PRS) configuration information to the NG-RAN node 602 and the UE 204 for the selected positioning method(s). Alternatively or additionally, the NG-RAN node 602 may provide DL-PRS and/or uplink PRS (UL-PRS) configuration information to the UE 204 for the selected positioning method(s). Note that while FIG. 6 illustrates a single NG-RAN node 602, there may be multiple NG-RAN nodes 602 involved in the positioning session.

Once configured with the DL-PRS and/or UL-PRS configurations, the NG-RAN node 602 and the UE 204 transmit and receive/measure the respective PRS at the scheduled times. The NG-RAN node 602 and the UE 204 then send their respective measurements to the LMF 270. In some cases, the NG-RAN node 602 may send its measurements to the UE 204, which may forward them to the LMF 270 using LPP signaling. Alternatively, the NG-RAN node 602 may send its measurements directly to the LMF 270 in LPPa or NRPPa signaling. In some cases, the UE 204 may send its measurements to the NG-RAN node 602 in RRC, uplink control information (UCI), or MAC control element (MAC-CE) signaling, and the NG-RAN node 602 may forward the measurements to the LMF 270 using LPPa or NRPPa signaling. Alternatively, the UE 204 may send its measurements directly to the LMF 270 using LPP signaling.

Once the LMF 270 obtains the measurements from the UE 204 and/or the NG-RAN node 602 (depending on the type(s) of positioning method(s)), it calculates an estimate of the UE's 204 location using those measurements. Then, at stage 640, the LMF 270 sends a location services response, which includes the location estimate for the UE 204, to the AMF 264. The AMF 264 then forwards the location services response to the entity that generated the location services request at stage 650. Specifically, if the location services request was received from a 5GC LCS entity 680 at stage 610*a*, then at stage 650*a*, the AMF 264 sends a location services response to the 5GC LCS entity 680. If, however, the location services request was received from the UE 204 at stage 610*c*, then at stage 650*c*, the AMF 264 sends a location services response to the UE 204. Or, if the AMF 264 generated the location services request at stage 610*b*, then at stage 650*b*, the AMF 264 stores/uses the location services response itself.

Note that although the foregoing has described the UE positioning operation 600 as a UE-assisted positioning operation, it may instead be a UE-based positioning operation. A UE-assisted positioning operation is one where the LMF 270 calculates the location of the UE 204, whereas a UE-based positioning operation is one where the UE 204 calculates its own location. In the case of a UE-based positioning operation, stages 610*c* and 650*c* would be performed. The LMF 270 may still coordinate the transmission/measurement of DL-PRS (and possibly UL-PRS), but the measurements would be forwarded to the UE 204 rather than the LMF 270. As such, the location services response at stages 640 and 650*c* may be the measurements from the involved NG-RAN node(s) 602 rather than a location estimate of the UE 204. Alternatively, where the involved NG-RAN node(s) 602 forward their respective measurements directly to the UE 204 (e.g., via RRC signaling), the location services response at stage 640 may simply be a confirmation that the NG-RAN node and UE positioning procedures at stage 630 are complete.

In some scenarios, a target UE (e.g., UE 204), an LCS client (e.g., 5GC LCS entity 680), or an application function (AF) that is requesting the location of the target UE may know the time at which the location should be obtained. For example, in the case of periodic positioning, with a periodic deferred 5GC mobile terminated location request (5GC-MT-LR), the location of a UE is obtained at fixed periodic intervals. In this case, the location time is known in advance. As another example, for industrial IoT (IIoT) positioning, in a factory or warehouse with moving tools, components, packages, etc., there could be a precise expectation of when a moving tool, component, package, etc. will reach a specific location or will have completed a specific movement or operation. It may then be useful or even critical to locate the tool, component, package, etc. to confirm the expectation and make any further adjustments if needed. As yet another example, for scheduled locations, the location of a UE may sometimes be scheduled to occur at specific times in the future. For example, vehicles on a road may all be positioned at the same time to provide an indication of traffic congestion as well as to assist with V2X communications. In addition, people, containers, transportation systems, etc. may also be located at certain common times.

In the scenarios above, the known time, referred to as the scheduled location time, can be provided in advance to reduce the effective latency in providing location results. A general UE positioning operation was described above with reference to FIG. 6. Referring to FIG. 6, the primary impact of advance scheduling to the 5GC is at stages 610 and 620. At stage 610, a scheduled location time T is included in the location services request from the 5GC LCS entities 680, from the AMF 264, or from the UE 204. The location services request including the scheduled location time T is then transferred to an LMF 270 at stage 620. The scheduled location time T specifies a time in the future at which the location of the UE 204 is to be obtained. Said another way, the scheduled location time T is the time at which the estimated location of the UE 204 is expected to be valid. The impact to the RAN is at stage 630, where, as part of positioning the UE 204, the LMF 270 schedules positioning measurements to be performed by the UE 204 and/or the NG-RAN node 602 to occur at or near the scheduled location time T. The time at which the UE 204 and/or the NG-RAN node 602 are expected to perform positioning measurements is referred to as the scheduled measurement time T'.

Figure 7A:
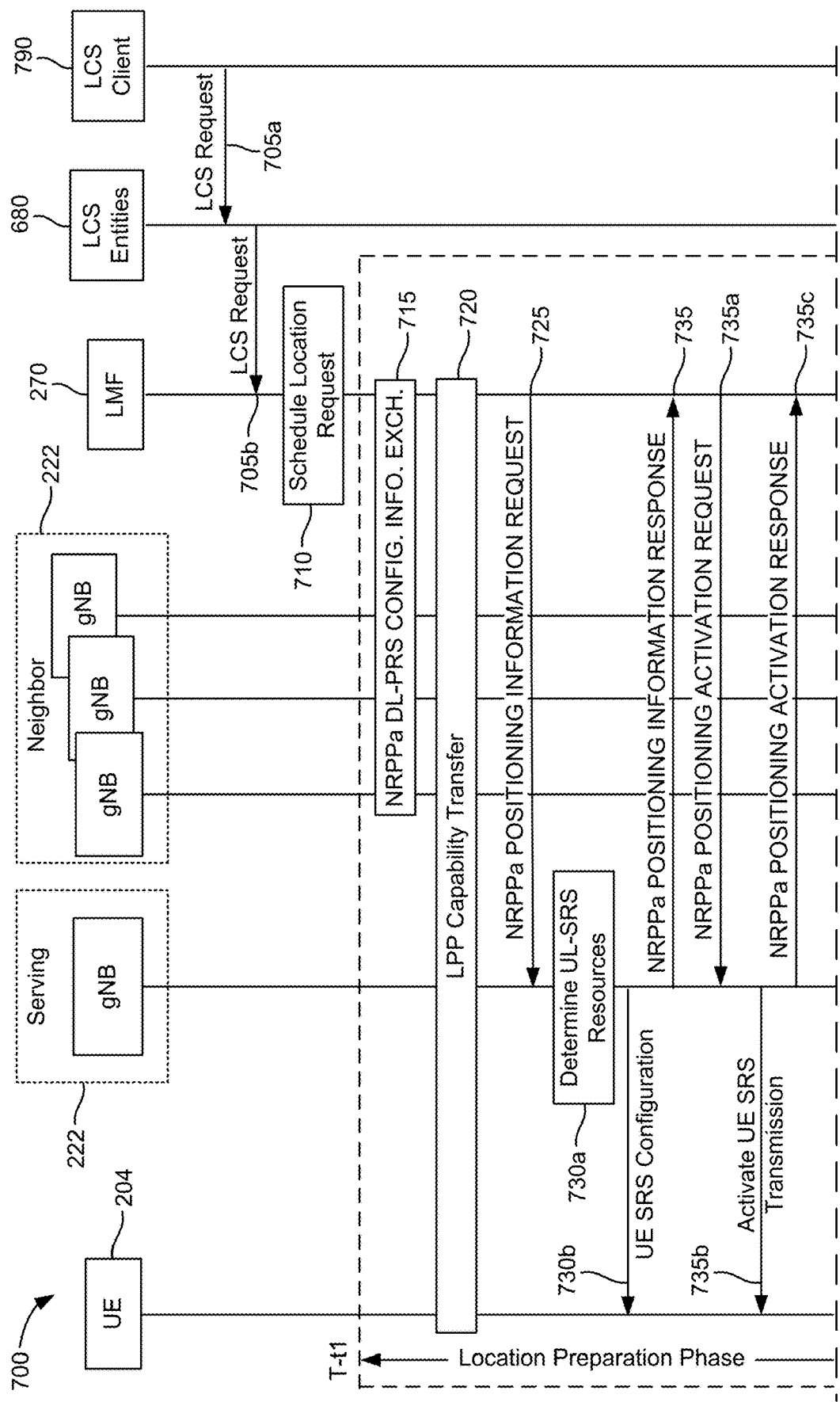
FIGS. 7A and 7B illustrate an example multi-RTT positioning procedure using advance scheduling, according to aspects of the disclosure.
Figure 7B:
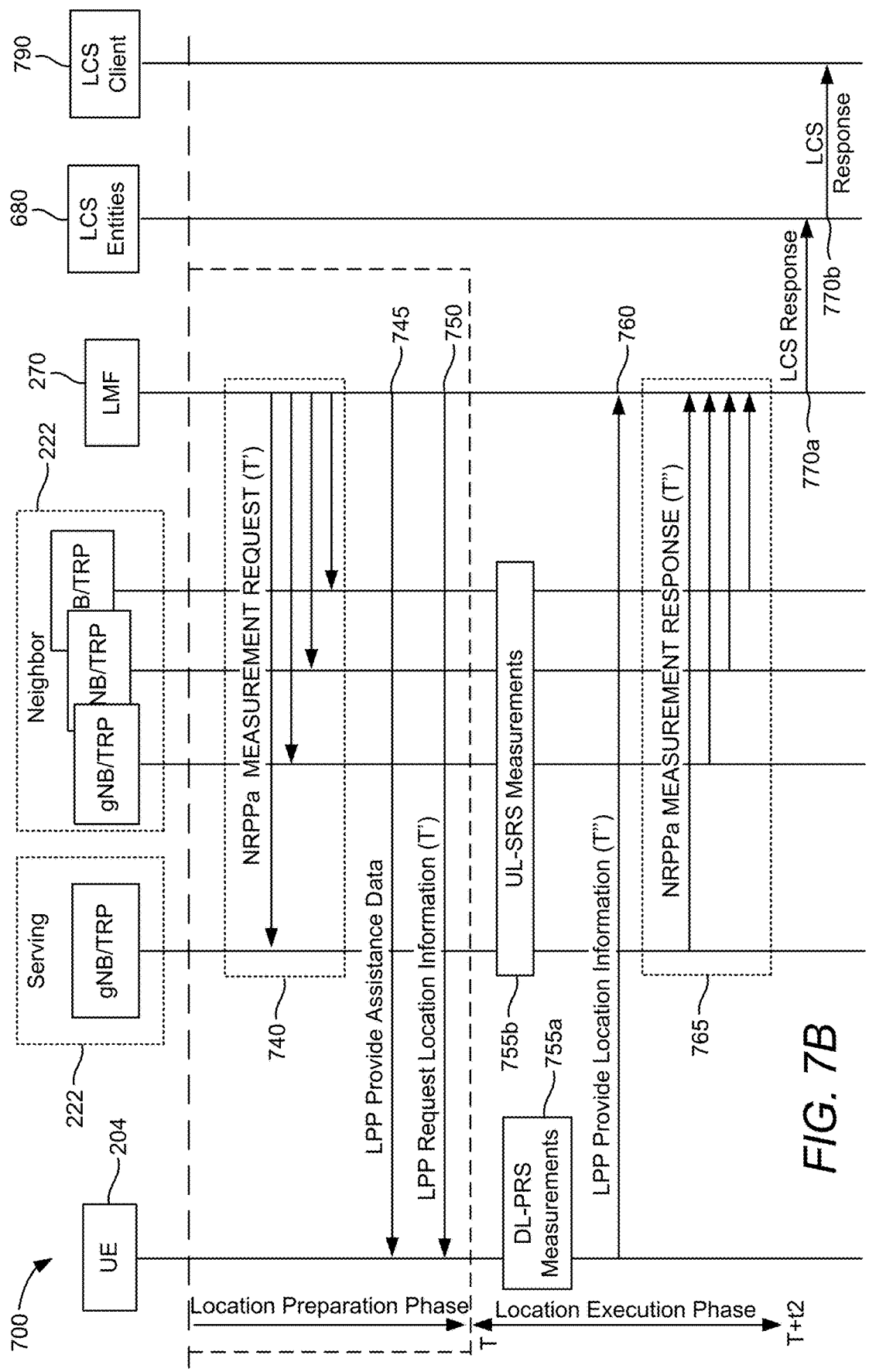

FIGS. 7A and 7B illustrate an example multi-RTT positioning procedure 700 using advance scheduling, according to aspects of the disclosure. As a multi-RTT positioning procedure is a downlink-and-uplink-based positioning procedure, a downlink-based or uplink-based positioning procedure would be a subset of the multi-RTT positioning procedure 700. When a scheduled location time is used, a positioning procedure can be divided into a location preparation phase (stages 705 to 750) and a location execution phase (stages 755 to 765).

The location preparation phase starts at a time T-t1 when the LMF 270 receives a location request from an AMF 264 (not shown) and determines the positioning method to be used. The location preparation phase ends after the LMF 270 has requested downlink measurements from the target UE 204, uplink measurements from the involved gNBs 222, and/or a location estimate from the UE 204. The location preparation phase includes any provision of assistance data to the UE (for downlink measurements or a location estimate) and request of configuration information from or provision of configuration information to gNBs 222.

The location execution phase begins at the scheduled location time T when the target UE 204 obtains downlink measurements (and possibly determines a location estimate from these) and/or when the gNBs 222 obtain uplink measurements and ends at a time T+t2 when the UE location information has been provided to the LMF 270 (UE 204 and/or gNB 222 location measurements or UE location estimate). The effective positioning procedure latency in FIGS. 7A and 7B is then determined by the stages comprising the location execution phase only (i.e., between time T and time T+t2).

With specific reference to FIGS. 7A and 7B, at stage 705a, an LCS client 790 (e.g., an application running on the target UE 204, a remote application, etc.) sends an LCS request to the LCS entities 680. The LCS request includes a future time T at which the location of the UE 204 is desired. At stage 705b, the LCS entities 680 forwards the LCS request to the LMF 290. At stage 710, the LMF 270 schedules a location session such that the UE's 204 location can be obtained and be valid at the requested location time T. As shown in FIG. 7A, the subsequent location preparation phase starts at time T-t 1, where t/depends on the expected duration of the location preparation phase. The expected duration of the location preparation phase depends on the selected positioning method, here, a multi-RTT positioning procedure.

At stage 715 (the first stage of the location preparation phase), the LMF 270 performs a DL-PRS configuration information exchange with the serving and neighbor gNBs 222 of the target UE 204 via NRPPa signaling. At stage 720, the LMF 270 performs a capability transfer with the UE 204 via LPP signaling. Specifically, the LMF 270 sends an LPP Request Capabilities message to a target UE 204, as at stage 610 of FIG. 6, and in response, the UE 204 sends an LPP Provide Capabilities message to the LMF 270, as at stage 620 of FIG. 6.

At stage 725, the LMF 270 sends an NRPPa Positioning Information Request to the target UE's 204 serving gNB 222 (or TRP) to request UL-SRS configuration information for the UE 204. The LMF 270 may provide any assistance data needed by the serving gNB 222 (e.g., pathloss reference, spatial relation, SSB configuration, etc.). At stage 730a, the serving gNB 222 determines the resources available for UL-SRS and configures the target UE 204 with the UL-SRS resource sets. At stage 730b, the serving gNB 222 provides the UL-SRS configuration information to the UE 204. At stage 735, the serving gNB 222 sends an NRPPa Positioning Information Response message to the LMF 270. The NRPPa Positioning Information Response message includes the UL-SRS configuration information sent to the UE 204.

At stage 735a, the LMF 270 sends an NRPPa Positioning Activation Request message to the serving gNB 222 instructing it to configure the UE 204 to activate UL-SRS transmission on the configured/allocated resources. The UL-SRS may be aperiodic (e.g., on-demand) UL-SRS, and therefore, at stage 735b, the serving gNB 222 configures/ instructs the UE 204 to activate (i.e., begin) UL-SRS transmission. At stage 735c, the serving gNB 222 sends an NRPPa Positioning Activation Response message to the LMF 270 to indicate that UL-SRS transmission has been activated.

At stage 740, the LMF 270 sends an NRPPa Measurement Request message to the gNBs 222. The NRPPa Measurement Request message includes all information needed to enable the gNBs 222 to perform uplink measurements of the UL-SRS transmissions from the target UE 204. The NRPPa Measurement Request message also includes a physical measurement time T' that indicates when the location measurements are to be obtained. The time T' defines the time T that the location of the target UE 204 will be valid and may be specified as a system frame number (SFN), a subframe, a slot, an absolute time, etc. The time T' is provided in the same units as the time T.

At stage 745, the LMF 270 sends assistance data to the UE 204 for the multi-RTT positioning procedure 700 in one or more LPP Provide Assistance Data messages, as at stage 730 of FIG. 7. The LPP Provide Assistance Data message(s) includes all information needed to enable the UE 204 to perform positioning measurements (here, Rx-Tx time difference measurements) of the DL-PRS transmissions from the gNBs 222. At stage 750, the LMF 270 sends an LPP Request Location Information message to the target UE 204, as at stage 740 of FIG. 7. The LPP Request Location Information message may also include the time T' (although it may be a different time T' than is provided to the gNBs 222 at stage 740). At this point, the location preparation phase is over.

At stage 755a, the target UE 204 performs measurements (here, Rx-Tx time difference measurements) of the DL-PRS transmitted by the involved gNBs at time T' (or such that the measurements are valid at time T') based on the assistance data received at stage 745. At stage 755b, the involved gNBs 222 perform measurements (here, Tx-Rx time difference measurements) of the UL-SRS transmitted by the target UE 204 at time T' (or such that the measurements are valid at time T') based on the assistance data received at stage 740 in the NRPPa Measurement Request message.

At stage 760, the target UE 204 sends an LPP Provide Location Information message. The LPP Provide Location Information message includes the positioning measurements performed by the UE 204 at stage 755a. At stage 765, the involved gNBs 222 send NRPPa Measurement Response messages to the LMF 270. The NRPPa Measurement Response messages include the measurements of the UL-SRS measured at stage 755b. The responses at stages 760 and 765 include the time T" at which the measurements were obtained. The time T" should be equal to the time T', but due to processing delays, timing issues, and/or other factors, may not be exactly equal to time T'. The difference between times T' and T" is the location time error ($\delta$).

At stage 770a, the LMF 270 sends an LCS response message to the LCS entities 680. The LCS response message includes the location of the target UE 204 at time T+6. The LCS entities 680 forward the LCS response message to the LCS client 790. The LCS client 790 receives the location of the target UE 204 with timestamp T+$\delta$ at time T+t2, where time t2 is the latency between time T and the response time. The latency t2 as observed by the LCS client 790 excludes the location preparation phase from time T-t1 to time T. Any movement by the UE 204 during the latency time t2 should have a negligible impact on the validity and accuracy of the location estimate. That is, the location of the UE 204 at time T+t2 should be about the same as the location of the UE 204 at time T.

Figure 8:
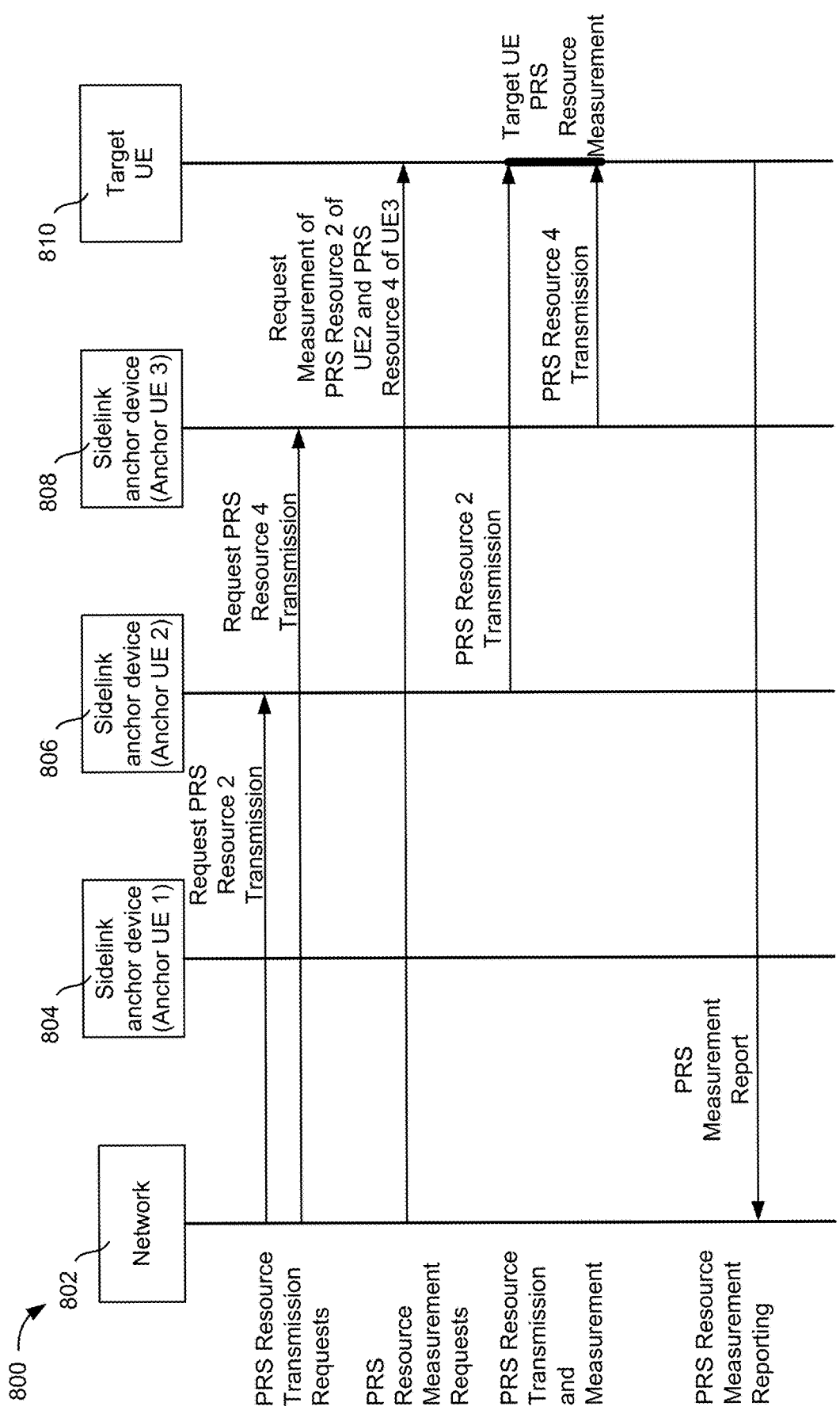
FIG. 8 illustrates an example call flow for positioning operations that may be executed in accordance with certain aspects of the disclosure.

FIG. 8 illustrates an example call flow 800 for positioning operations that may be executed in accordance with certain aspects of the disclosure. In this example, network 802 controls the operation of sidelink anchor devices 804, 806, 808, and target UE 810 during the positioning operations. For purposes of the following discussion, it is assumed that sidelink anchor devices 806 and 808 are being used as the preferred anchor devices by the target UE 810. Accordingly, only sidelink anchor devices 804 and 806 are involved in the positioning operations described in connection with FIG. 8. However, the network 802 may merely use the preferred anchor report as positioning assistance data and elect to use additional sidelink anchor devices or fewer sidelink anchor devices than the reported preferred sidelink anchor devices.

As shown in FIG. 8, the network 802 transmits a PRS transmission request to each of the preferred sidelink anchor devices 806 and 808. The PRS transmission request to each of the preferred sidelink anchor devices requests transmission of one or more PRS by each preferred sidelink anchor devices. In this example, the network 802 transmits a PRS transmission request to sidelink anchor device 806 requesting the transmission of PRS on PRS Resource 2 by the sidelink anchor device 806, and a PRS resource transmission request to sidelink anchor device 808 requesting the transmission of PRS on PRS Resource 4 by the sidelink anchor device 808. In systems employing a larger number of preferred sidelink anchor devices, similar PRS requests are sent to each of the additional preferred sidelink anchor devices.

The network 802 sends a PRS measurement request to the target UE 810 to measure the PRS that have been requested for transmission from sidelink anchor devices 806 and 808. In this example, the network 802 sends a PRS measurement request to the target UE 810 to measure one or more PRS are transmitted in PRS Resource 2 of sidelink anchor device 806 and one or more PRS are transmitted in PRS Resource 4 of sidelink anchor device 808. In response to the PRS resource transmission requests from the network 802, sidelink anchor device 806 transmits its PRS in PRS Resource 2, and sidelink anchor device 808 transmits its PRS in PRS Resource 4. Target UE 810 responds to the PRS measurement request from network 802 by measuring the PRS transmitted on PRS Resource 2 of sidelink anchor device 806 and the PRS transmitted on PRS Resource 4 of sidelink anchor device 808. The measurements taken by the target UE 810 are reported in a PRS measurement report that is communicated directly to the network 802, which uses the PRS measurement report to determine the location of the target UE 810.

The network 802 may use various positioning methods to determine the location of the target UE 810 using the PRS measurement report. In accordance with certain aspects, the network 802 uses the data received in the PRS measurement report to determine the location of the target UE 810 using time difference of arrival (TDOA) positioning, as described above with reference to FIG. 5. Since the target UE 810 does not transmit a PRS in the call flow 800 of FIG. 8, the network 802 may take additional steps to compensate for synchronization errors between the sidelink anchor devices. In one example, the network 802 may send a PRS transmission request to a first sidelink anchor device 806 of the sidelink anchor devices within the positioning environment, where the PRS transmission request is a request for the first sidelink anchor device 806 to transmit one or more PRS. The network 802 may send a PRS measurement request to a second sidelink anchor device 808 of the sidelink anchor devices within the positioning environment, where the second request is a request for the second sidelink anchor device 808 to measure the transmitted PRS of the first sidelink anchor device. The second sidelink anchor device 808 reports the measurements of the PRS to the network 802, which can use the PRS measurements to compensate for synchronization errors that exist between the first sidelink anchor device and the second sidelink anchor device.

In accordance with certain aspects of the disclosure, the network 802 may use multi-cell round trip time (multi-RTT) positioning to determine the location of the target UE 810. In such instances, the network 802 may also send a PRS transmission request to the target UE 810 that requests transmission of one or more PRS. Additionally, the network 802 may send a PRS measurement request to each sidelink anchor device that requests the sidelink anchor device to measure the transmitted PRS of the target UE 810. The sidelink anchor devices report the Rx-Tx time difference measurements to the network 802, which uses the Rx-Tx time difference measurements reported by the sidelink anchor devices as well as the Rx-Tx time difference measurements reported by the target UE to determine the location of the target UE 810 using a multi-RTT positioning method.

Figure 9:
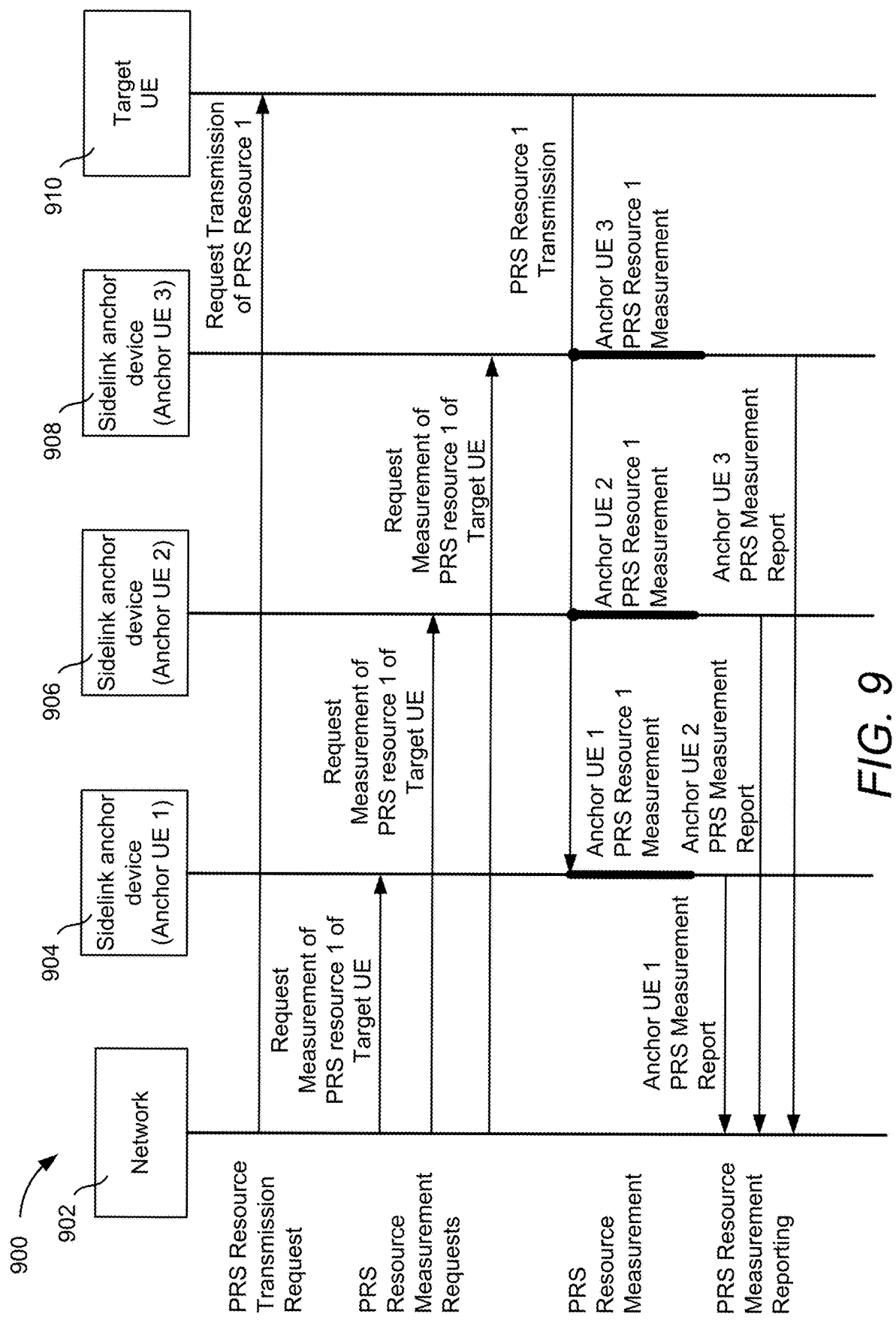
FIG. 9 illustrates an example of a call flow for positioning operations that may be executed in accordance with certain aspects of the disclosure.

FIG. 9 illustrates an example of a call flow 900 for positioning operations that may be executed in accordance with certain aspects of the disclosure. In this example, the network 902 controls the operation of sidelink anchor devices 904, 906, 908, and target UE 910 during the positioning operations. For purposes of the following discussion, it is assumed that all sidelink anchor devices 904, 906, and 908 have been selected by the network 902 to determine the position of the target UE 910.

As shown in FIG. 9 the network 902 transmits a PRS transmission request to the target UE 910. The PRS transmission request to the target UE 910 requests transmission of one or more PRS by the target UE 910. In this example, the network 902 transmits a PRS transmission request to the target UE 910 requesting the transmission of one or more PRS in PRS Resource 1.

The network 902 transmits a PRS measurement request to each of the sidelink anchor devices 904, 906, and 908. In FIG. 9, the PRS measurement request to each sidelink anchor device requests the sidelink anchor device to measure one or more PRS transmitted in PRS Resource 1 of the target UE 910. The target UE 910 transmits one or more PRS in PRS Resource 1, which is received by each of the sidelink anchor devices 904, 906, and 908. Each sidelink anchor device measures the signal strength of the PRS in PRS Resource 1 and reports the PRS measurement to the network 902 in a corresponding measurement report. The network 902 may determine the position of the target UE 910 using the PRS measurement reports received from the sidelink anchor devices 904, 906, and 908.

Conventional NR positioning relies on measurements of and by anchors such as gNBs/TRPs that are at fixed locations (e.g., anchors at known positions that are not mobile). Mobile anchor devices could arise in SL positioning. However, conventional NR positioning does not define any procedures for the use of mobile anchor devices when the positioning of a target mobile device is scheduled in advance. Certain aspects of the disclosure are implemented with a recognition that it may be desirable to employ mobile anchor devices (e.g., mobile UEs, mobile gNBs such as in mobile-integrated access backhaul/vehicle mounted relay (IAB/VMR), or in GNSS, where the satellites are mobile) when performing positioning operations to determine the position of a target mobile device at a scheduled future time.

In accordance with certain aspects of the disclosure, the scheduling and determination of the position of the target mobile device at a scheduled future time may be undertaken in a manner similar to that shown in FIG. 7A and FIG. 7B. However, certain aspects of the disclosure incorporate solutions that facilitate the use of mobile anchor devices in the positioning operations that take place at the future scheduled time. The scheduling may be based on a one shot request for location at a specified time, an aperiodic schedule for multiple location requests, and/or periodic location requests in which the first instance for performing the periodic location starts at a specified time.

In accordance with certain aspects of the disclosure, the location server (e.g., an LMF) performs operations in multiple phases when using a mobile anchor device. Although certain aspects of the disclosure may reference a single mobile anchor device, it is to be understood that the aspects may be extended to scenarios using multiple mobile anchor devices.

In an aspect, the location server may receive a request to determine a position of a target mobile device at a first scheduled time. In preparation for using a mobile anchor device, the location server may perform a location preparation phase in which the position of the mobile anchor device is determined. During this phase, the location server also configures the mobile anchor device (and any other participating fixed anchor devices) to transmit and/or receive PRS during a time window corresponding to the first scheduled time to determine the position of the target mobile device. The initial determination of the position of the mobile anchor device is performed to ensure that the scheduled PRS transmission/reception occur at a time at which the mobile anchor device is at a known position. The location server may also make determinations as to whether the mobile anchor device is at position to perform useful PRS transmissions/receptions that will result in high quality PRS measurements. In certain aspects, the location server may use the position of the mobile anchor device to optimize the combination of fixed and/or mobile anchor devices used to achieve the desired GDOP properties for determining the position of the target mobile device.

In certain aspects, the location server determines a first position of a mobile anchor device during a first time window before the first scheduled time. The location server then configures the mobile anchor device to perform positioning operations during a second time window corresponding to the first scheduled time to assist in the determination of the position of the target mobile device at the first scheduled time. In certain aspects, the mobile anchor device is configured to perform positioning operations including 1) for transmitting PRS to be measured by the target mobile device during the second time window, 2) measuring one or more PRS received from the target mobile device during the second time window, or 3) a combination thereof.

In accordance with certain aspects of the disclosure, the location server may implement a schedule for determining the position of the mobile anchor device. However, in such instances, the location server need not receive a direct request from an external client (e.g., a UE, RAN node, PSAP, etc.) to initiate the determination of the position of the mobile anchor location. Rather, in certain aspects, the position of the mobile anchor device is used for the purpose of positioning the target mobile device based on an external client request. In certain aspects, the signaling associated with the existing manner of scheduling future positioning operations may be supplemented with signaling that supports similar scheduling of the mobile anchor devices. In certain aspects, the scheduling of the positioning determinations for the mobile anchor devices may be based on past and projected trajectories of the mobile anchor devices. In certain aspects, the position of the mobile anchor device used by the location server in its positioning determinations may not be the first position of the target mobile device as determined during the first time window. Rather, the position of the mobile anchor device used by the location server in its positioning determinations may be based on the first position (as determined during the first time window) and a projected position of the mobile anchor device (based on the first position (or history of positions) and its projected trajectory in the positioning environment). In certain aspects, the location server may configure the second time window to occur within a time threshold of the first time window. The mobile anchor device may be expected to be at the first position or within a threshold distance of the first position during the second time window.

In certain aspects, the request to determine the position of the target mobile device at the first scheduled time may indicate a tolerance for deviating from the first scheduled time. In such instances, the location server may adjust the first scheduled time based, for example, on GDOP considerations. The location server, in turn, may schedule the second time window based on the first scheduled time and the indicated tolerance. If the request does not indicate a tolerance and/or the GDOP considerations cannot be met using the first scheduled time, the location server may send a request to change the first scheduled time including any suggested deviations. The requesting client and the location server may then engage in negotiations for determining other times at which the location of the target mobile device may be determined.

It may be noted that the anchors used to locate the mobile anchor device may not be the same as the anchors used to locate the target mobile device. As such, the GDOP considerations used by the location server to locate the mobile anchor device may be different than the GDOP considerations used by the location server to locate the target mobile device. Ideally the time at which the mobile anchor device's location should be known would be the same as the time(s) at which the mobile anchor made its PRS transmissions and/or measurements for assisting in determining the position of the target mobile device. However, such an ideal situation may impose conflicting schedules for PRS transmissions and/or measurements. In certain aspects, the location server can reconcile such conflicts by scheduling the first time window and second time window (e.g., the two 'scheduled locations' operations) so that they are within a threshold time of one another thereby allowing for time to separate out the scheduling conflicts. The location server may also attempt to align the timing of the positioning operations performed by the two anchor-sets (e.g., the first anchor set used to determine the location of the mobile anchor device and the second anchor set used to determine the location of the target mobile device) for determining the two positions (e.g., the position of the mobile anchor device and the position of the target mobile device) to reduce the number of conflicts.

In an aspect of the disclosure, the location server (alone, or with the assistance of one or more anchor UEs) determines a first set positions for one or more mobile anchor devices based on GDOP considerations for determining a position of the target mobile device. The location server performs positioning operations to determines whether any of the mobile anchor devices are within threshold distances of the first set of positions. To this end, the location server may receive positioning information indicating positions of one or more mobile anchor devices from one or more network entities (e.g., anchor UEs, base stations, etc.) and compare the received positioning information with the first set of positions to determine which, if any, of the mobile anchor devices are within threshold distances of the positions of the first set of positions. The mobile anchor devices within the threshold distances are configured by the location server to perform positioning operations to determine the position of the target mobile device. The location server may determine whether the mobile anchor devices within the threshold distances are capable of performing the positioning operations before they are configured.

In certain situations, the location server may not be able to meet the timing requirements for determining the position of the target mobile device at the specified first scheduled time. In such instances, the location server may receive a tolerance for deviating from the first scheduled time and schedule the second time window based on the first scheduled time and the tolerance. As part of this scheduling based on the indicated tolerance, the location may first send a request to the requesting client to change the first scheduled time based on the tolerance.

In accordance with certain aspects of the disclosure, the location server may transmit control messages that are used to move the mobile anchor device to a desired location. Such control messages may be communicated directly to the mobile anchor device or indirectly to an anchor device that controls the movement of the mobile anchor device. In certain aspects, the control messages may be communicated via the application layer. For example, the location server may configure (either directly or indirectly) one or more mobile anchor devices to move to one or more of the first set of positions. As an example, the location server may send a request to one or more network entities to request the one or more network entities to configure a mobile anchor device to move to a position of the first set of positions. In certain aspect, the location server may receive a confirmation message from a network entity indicating that a mobile anchor device has moved to the desired position. The confirmation message may further indicate the identity of the mobile anchor device that has moved to the desired position.

Figure 10A:
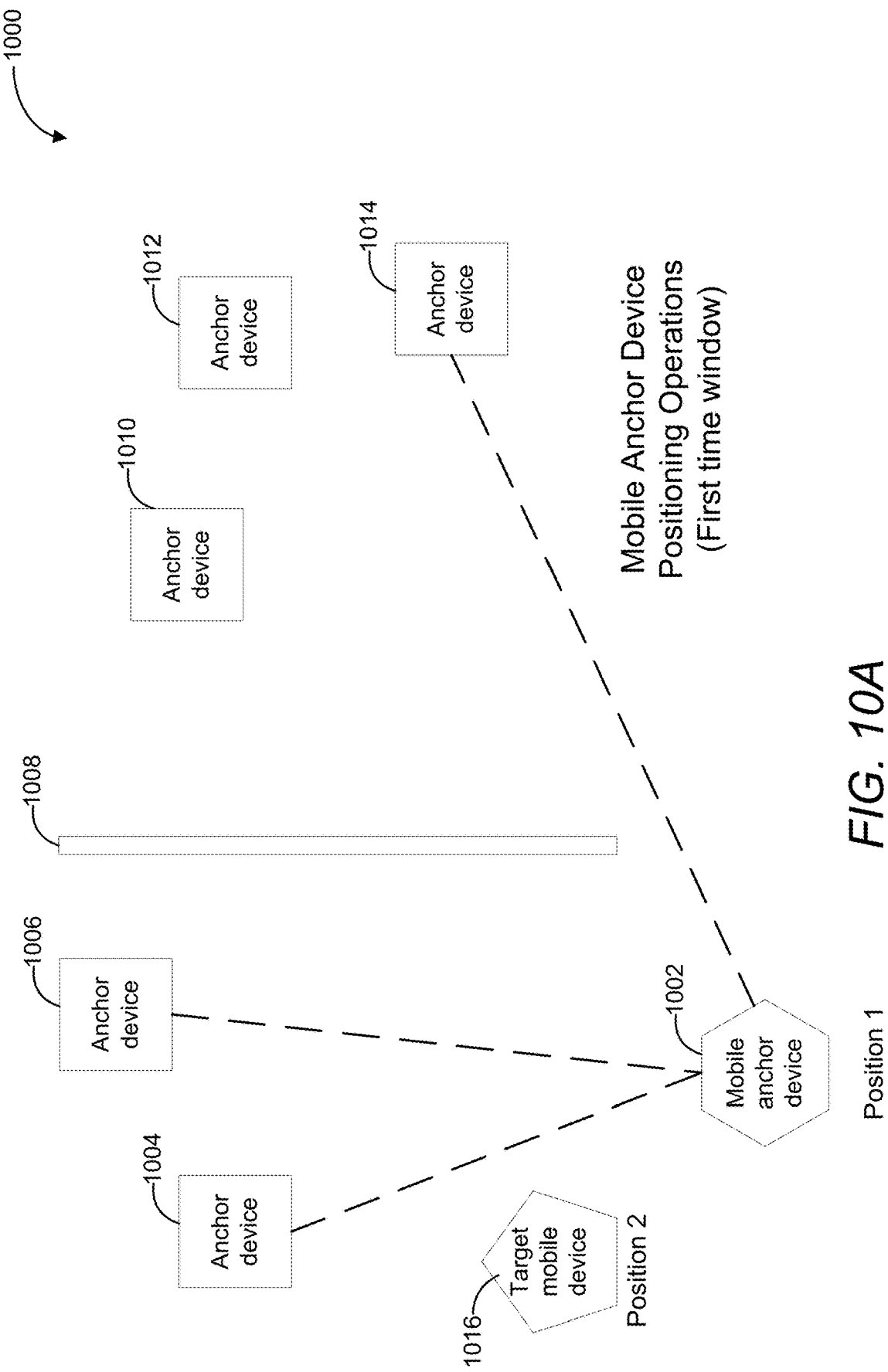
FIGS. 10A through 10D show a positioning environment during example time windows, according to aspects of the disclosure.

FIGS. 10A through 10D show a positioning environment 1000 during example time windows, according to aspects of the disclosure. FIG. 10A depicts the positioning environment 1000 during the first time window described above when the position of a mobile anchor device 1002 is determined. In FIG. 10A, the positioning environment includes the fixed anchor devices 1004 and 1006 that are located at a first side of an obstacle 1008 and the fixed devices 1010, 1012, and 1014 that are located at a second side of the obstacle 1008. In this example, the obstacle 1008 obstructs radio wave propagation. Here, a location server has determined that the fixed anchor devices 1004, 1006, and 1014 are best suited for determining the position of the mobile anchor device 1002 (e.g., these devices provide the best unobstructed pathways and/or desired GDOP characteristics for determining the location of the mobile anchor device 1002). As such, the location server configures the fixed anchor devices 1004, 1006, 1014, and mobile anchor device 1002 to perform positioning operations during the first time window to assist in determining the position of the mobile anchor device 1002, shown here at Position 1. FIG. 10A also shows a target mobile device 1016 located at Position 2 on the same side of obstacle 1008 as fixed anchor devices 1006, 1004, and mobile anchor device 1002.

Figure 10B:
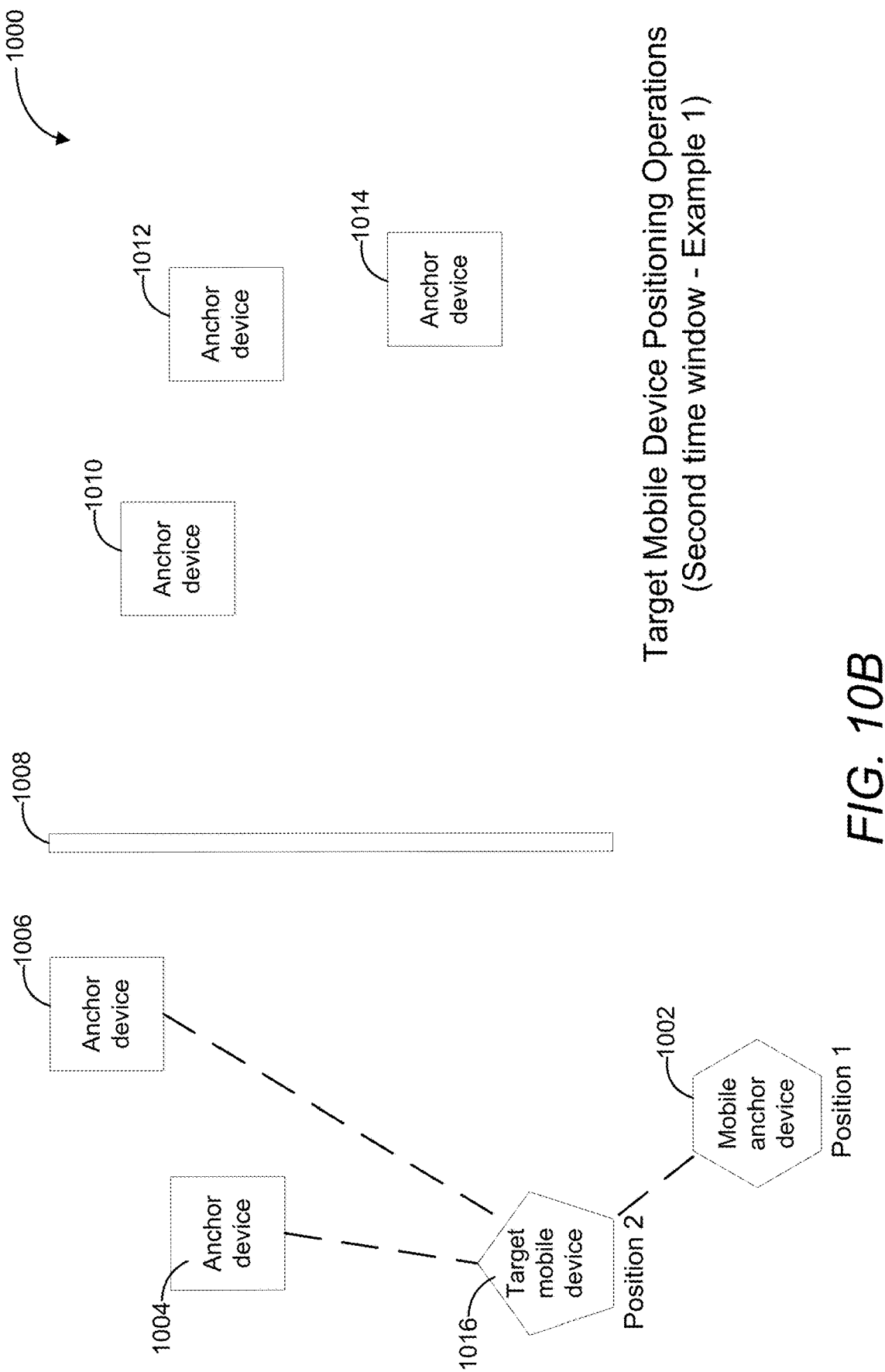

FIG. 10B shows a first example of the positions of various devices in the positioning environment 1000 during the second time window describe above, according to aspects of the disclosure. Here, the location server has determined that the fixed anchor devices 1004, 1006, and mobile anchor device 1002 are best suited for determining the position of the target mobile device 1016 (e.g., the devices provide the best unobstructed pathways and/or desired GDOP characteristics for determining the location of the target mobile device 1016). As such, the location server configures the fixed anchor devices 1004, 1006, mobile anchor device 1002, and target mobile device 1016 to perform positioning operations during the second time window to assist in determining the position of the target mobile device 1016, shown here at Position 2. During the second time window, the mobile anchor device 1002 is still located at Position 1 (or at least within a threshold distance of Position 1).

Figure 10C:
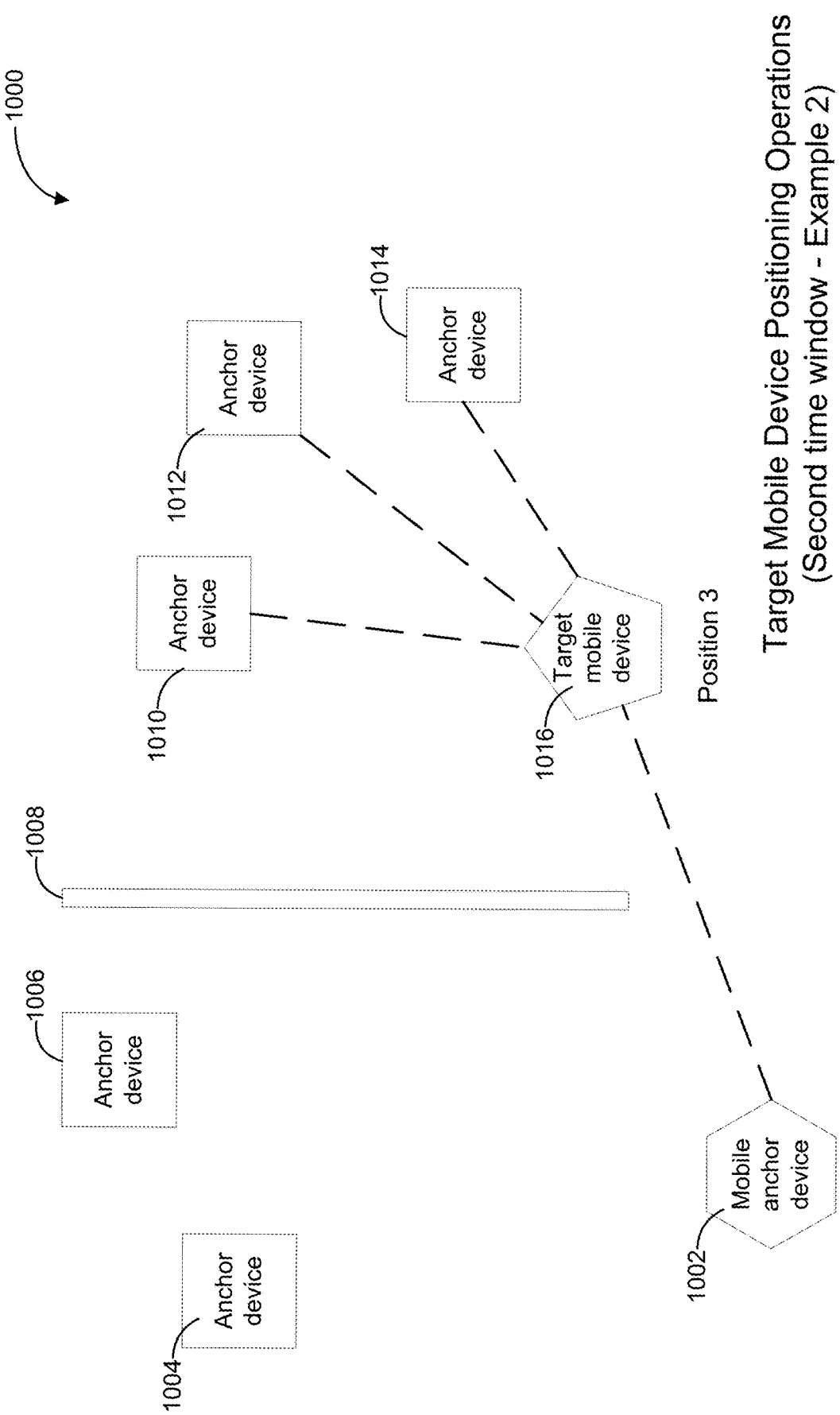

FIG. 10C shows a second example of the positions of various devices in the positioning environment 1000 during the second time window described above, according to aspects of the disclosure. When compared to FIG. 10A, where the target mobile device 1016 is located at Position 2 during the first time window, the target mobile device 1016 has moved to Position 3 in FIG. 10C for the second time window. Here, the location server has determined that the fixed anchor devices 1010, 1012, 1014 and mobile anchor device 1002 are best suited for determining the position of the target mobile device 1016 (e.g., the devices provide the best unobstructed pathways and/or desired GDOP characteristics for determining the location of the target mobile device 1016). As such, the location server configures the fixed anchor devices 1010, 1012, 1014, mobile anchor device 1002, and target mobile device 1016 to perform positioning operations during the second time window to assist in determining the position of the target mobile device 1016, shown here at Position 3. During the second time window, the mobile anchor device 1002 is still located at Position 1 (or at least within a threshold distance of Position 1).

Figure 10D:
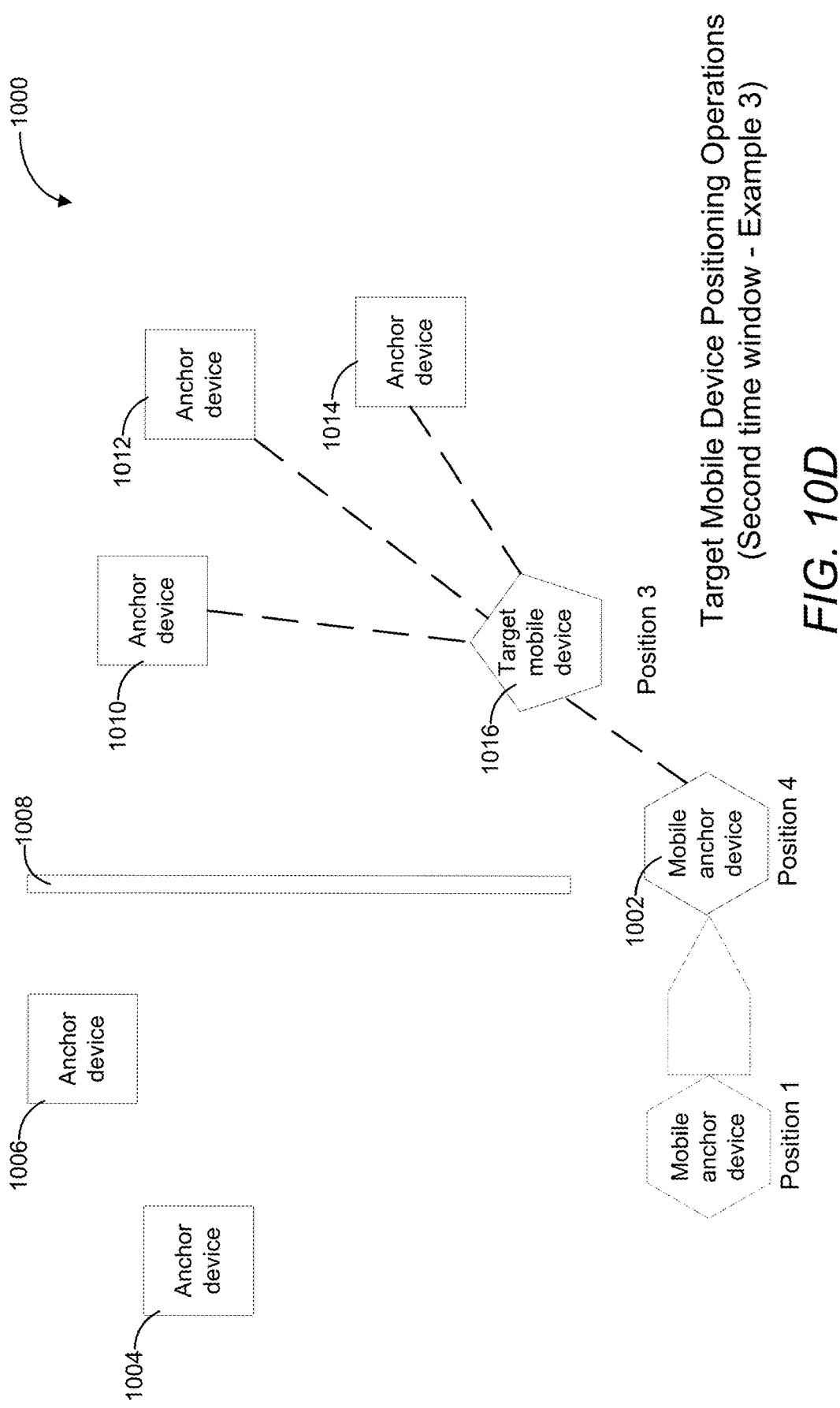

FIG. 10D shows a third example of the positions of various devices in the positioning environment 1000 during the second time window described above, according to aspects of the disclosure. Here, the location server has determined that the mobile anchor device 1002 should be moved from Position 1 to Position 4 for the operations that are to take place during the second time window. For example, the location server may determine that the mobile anchor device 1002, when at Position 4, is more suitable for use with fixed anchor devices 1010, 1012, and 1014 for determining the position of the target mobile device 1016 (e.g., the devices at these positions provide the best unobstructed pathways and/or desired GDOP characteristics for determining the location of the target mobile device 1016) than at Position 1. Accordingly, the location server may send one or more control messages to the mobile anchor device 1002, either directly or indirectly through other network entities, that direct the mobile anchor device 1002 to move to Position 4 by the time of the second time window. With the mobile anchor device 1002 properly position, the location server configures the fixed anchor devices 1004, 1006, mobile anchor device 1002, and target mobile device 1016 to perform positioning operations during the second time window to assist in determining the position of the target mobile device 1016, shown here at Position 2.

In the examples shown in FIGS. 10A through 10D, the target mobile device 1016 is configured to transmit and/or receive PRS by the location server. However, the disclosed positioning operations may also be extended to object sensing scenarios in which the object has radio reflective surfaces. In this regard, wireless communication signals (e.g., RF signals configured to carry OFDM symbols in accordance with a wireless communications standard, such as LTE, NR, etc.) transmitted between a UE and a base station can be used for environment sensing (also referred to as "RF sensing" or "radar"). Using wireless communication signals for environment sensing can be regarded as consumer-level radar with advanced detection capabilities that enable, among other things, touchless/device-free interaction with a device/system. The wireless communication signals may be cellular communication signals, such as LTE or NR signals, WLAN signals, such as Wi-Fi signals, etc. As a particular example, the wireless communication signals may be an OFDM waveform as utilized in LTE and NR. High-frequency communication signals, such as mmW RF signals, are especially beneficial to use as radar signals because the higher frequency provides, at least, more accurate range (distance) detection.

Possible use cases of RF sensing include health monitoring use cases, such as heartbeat detection, respiration rate monitoring, and the like, gesture recognition use cases, such as human activity recognition, keystroke detection, sign language recognition, and the like, contextual information acquisition use cases, such as location detection/tracking, direction finding, range estimation, and the like, and automotive radar use cases, such as smart cruise control, collision avoidance, and the like.

Figure 11A:
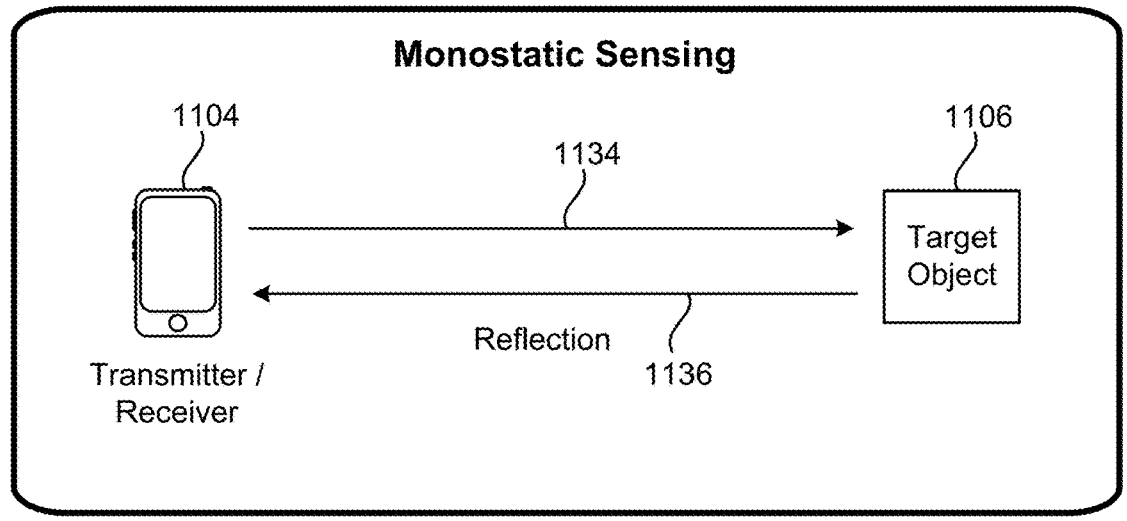
FIGS. 11A and 11B illustrate examples of the object sensing, according to aspects of the disclosure.
Figure 11B:
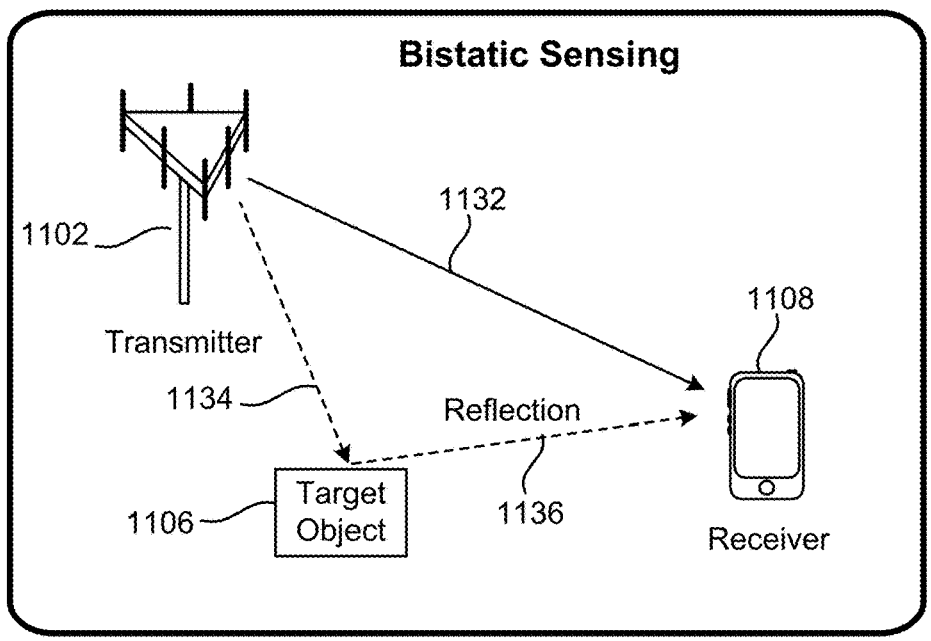

There are different types of sensing, including monostatic sensing (also referred to as "active sensing") and bistatic sensing (also referred to as "passive sensing"). FIGS. 11A and 11B illustrate these different types of sensing. Specifically, FIG. 11A is a diagram 1100 illustrating a monostatic sensing scenario and FIG. 11B is a diagram 1130 illustrating a bistatic sensing scenario. In FIG. 11A, the transmitter (Tx) and receiver (Rx) are co-located in the same device 1104 (e.g., a UE). The device 1104 transmits one or more RF sensing signals 1134 (e.g., uplink or sidelink positioning reference signals (PRS) where the device 1104 is a UE), and some of the RF sensing signals 1134 reflect off one or more reflective RF surfaces of a target object 1106 as shown by reflections 1136. The sensing device 1104 can measure various properties (e.g., times of arrival (ToAs), angles of arrival (AoAs), phase shift, etc.) of the reflections 1136 of the RF sensing signals 1134 to determine characteristics of the target object 1106 (e.g., size, shape, speed, motion state, etc.).

In FIG. 11B, the transmitter (Tx) and receiver (Rx) are not co-located, that is, they are separate devices (e.g., a UE and a base station). Note that while FIG. 11B illustrates using a downlink RF signal as the RF sensing signal 1132, uplink RF signals or sidelink RF signals can also be used as RF sensing signals 1132. In a downlink scenario, as shown, the transmitter device 1102 is a base station and the receiver 1108 is a UE, whereas in an uplink scenario, the transmitter is a UE and the receiver is a base station.

Referring to FIG. 11B in greater detail, the transmitter device 1102 transmits RF sensing signals 1132 and 1134 (e.g., positioning reference signals (PRS)) to the receiver device 1104, but some of the RF sensing signals 1134 reflect off one or more RF reflective surfaces of the target object 1106. The receiver device 1104 (also referred to as the "sensing device") can measure the times of arrival (ToAs) of the RF sensing signals 1132 received directly from the transmitter device 1102 and the ToAs of the RF sensing signals 1134 reflected from the target object 1106 as shown by reflection 1136.

More specifically, as described above, a transmitter device (e.g., a base station) may transmit a single RF signal or multiple RF signals to a receiver device (e.g., a UE). However, the receiver may receive multiple RF signals corresponding to each transmitted RF signal due to the propagation characteristics of RF signals through multipath channels. Each path may be associated with a cluster of one or more channel taps. Generally, the time at which the receiver detects the first cluster of channel taps is considered the ToA of the RF signal on the line-of-site (LOS) path (i.e., the shortest path between the transmitter and the receiver). Later clusters of channel taps are considered to have reflected off objects between the transmitter and the receiver and therefore to have followed non-LOS (NLOS) paths between the transmitter and the receiver.

Thus, referring back to FIG. 11B, the RF sensing signals 1132 followed the LOS path between the transmitter device 1102 and the receiver 1108, and the RF sensing signals 1134 followed an NLOS path between the transmitter device 1102 and the receiver 1108 due to reflecting off the target object 1106. The transmitter device 1102 may have transmitted multiple RF sensing signals 1132, 1134, some of which followed the LOS path and others of which followed the NLOS path. Alternatively, the transmitter device 1102 may have transmitted a single RF sensing signal in a broad enough beam that a portion of the RF sensing signal followed the LOS path (RF sensing signal 1132), and a portion of the RF sensing signal followed the NLOS path (RF sensing signal 1134).

Based on the ToA of the LOS path, the ToA of the NLOS path, and the speed of light, the receiver device can determine the distance to the target object(s). For example, the receiver device can calculate the distance to the target object as the difference between the ToA of the LOS path and the ToA of the NLOS path multiplied by the speed of light. In addition, if the receiver device is capable of receive beamforming, the receiver device may be able to determine the general direction to a target object as the direction (angle) of the receive beam on which the RF sensing signal following the NLOS path was received. That is, the receiver device may determine the direction to the target object as the angle of arrival (AoA) of the RF sensing signal, which is the angle of the receive beam used to receive the RF sensing signal. The receiver device may then optionally report this information to the transmitter device, its serving base station, an application server associated with the core network, an external client, a third-party application, or some other sensing entity. Alternatively, the receiver device may report the ToA measurements to the transmitter device, or other sensing entity (e.g., if the receiver device does not have the processing capability to perform the calculations itself), and the transmitter device may determine the distance and, optionally, the direction to the target object.

Note that if the RF sensing signals are uplink RF signals transmitted by a UE to a base station, the base station would perform object detection based on the uplink RF signals just like the UE does based on the downlink RF signals.

Like conventional radar, wireless communication-based radar signal can be used to estimate the range (distance), velocity (Doppler), and angle (AoA) of a target object. However, the performance (e.g., resolution and maximum values of range, velocity, and angle) may depend on the design of the reference signal.

Figure 12:
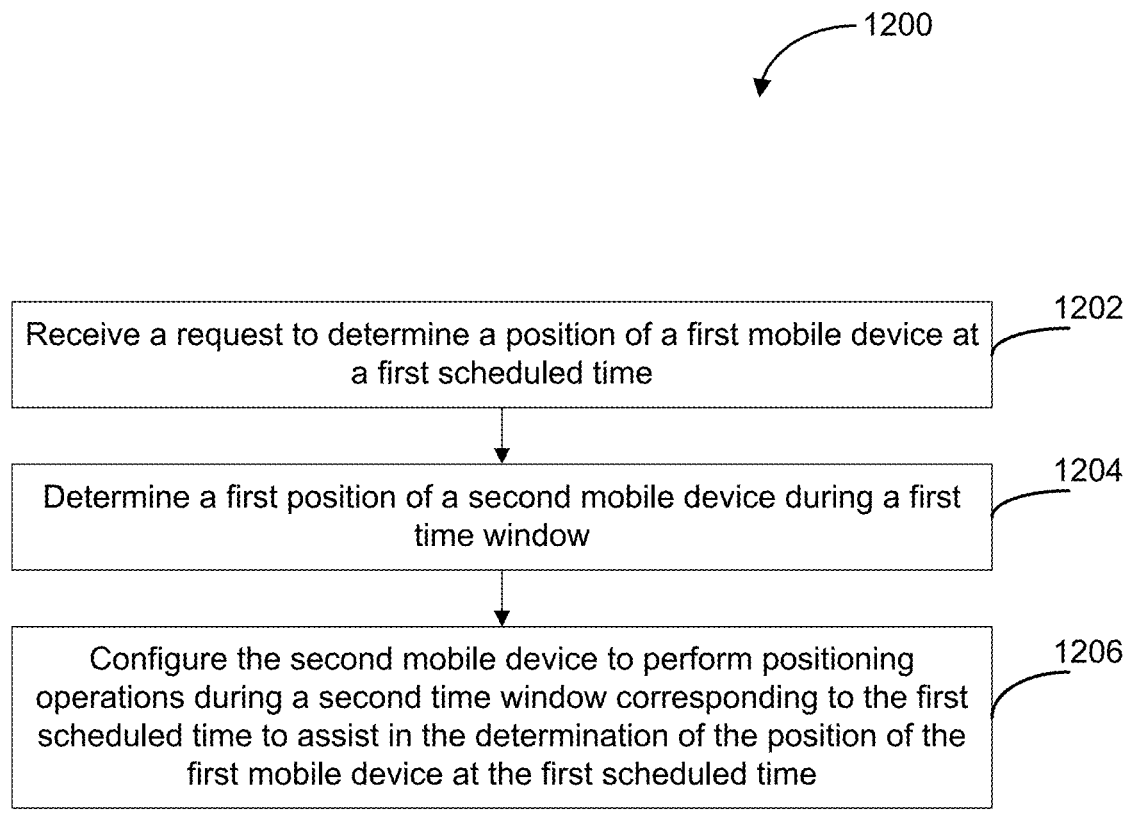
FIG. 12 illustrates an example method of wireless communication performed by a location server, according to aspects of the disclosure.

FIG. 12 illustrates an example method 1200 of wireless communication performed by a location server, according to aspects of the disclosure. At operation 1202, the location server receives a request to determine a position of a first mobile device at a first scheduled time. In an aspect, operation 1202 may be performed by the one or more network transceivers 390, the one or more processors 394, memory 396, and/or positioning component 398, any or all of which may be considered means for performing this operation.

At operation 1204, the location server determines a first position of a second mobile device during a first time window. In an aspect, operation 1204 may be performed by the one or more network transceivers 390, the one or more processors 394, memory 396, and/or positioning component 398, any or all of which may be considered means for performing this operation.

At operation 1206, the location server configures the second mobile device to perform positioning operations during a second time window corresponding to the first scheduled time to assist in the determination of the position of the first mobile device at the first scheduled time. In an aspect, operation 1206 may be performed by the one or more network transceivers 390, the one or more processors 394, memory 396, and/or positioning component 398, any or all of which may be considered means for performing this operation.

As will be appreciated, a technical advantage of the method 1200 is that the location server uses a second mobile device in a scheduled determination of a position of a first mobile device at a future time.

Figure 13:
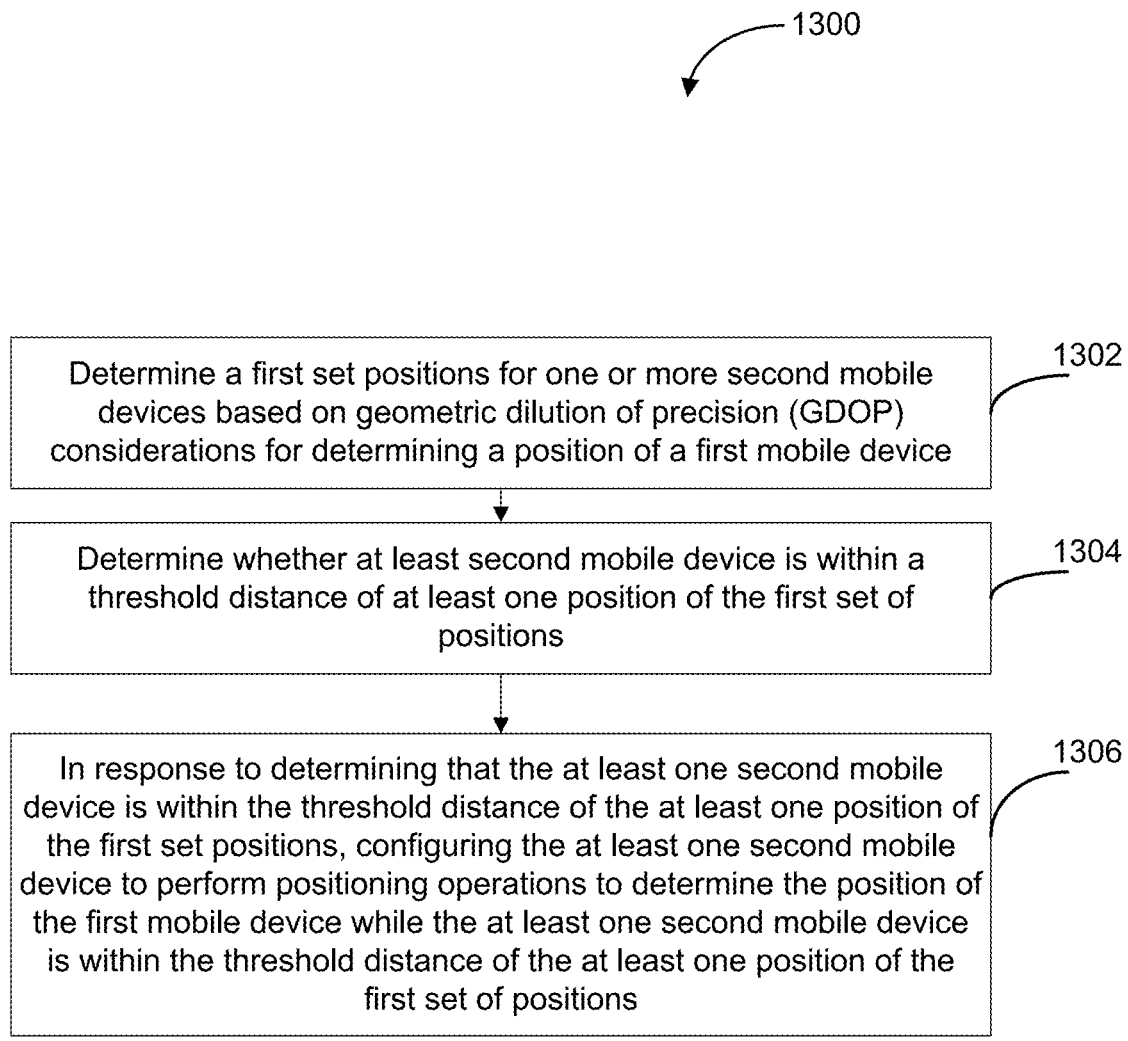
FIG. 13 illustrates an example method of wireless communication performed by a location server, according to aspects of the disclosure.

FIG. 13 illustrates an example method 1300 of wireless communication performed by a location server, according to aspects of the disclosure. At operation 1302, the location server determines a first set positions for one or more second mobile devices based on geometric dilution of precision (GDOP) considerations for determining a position of a first mobile device. In an aspect, operation 1302 may be performed by the one or more network transceivers 390, the one or more processors 394, memory 396, and/or positioning component 398, any or all of which may be considered means for performing this operation.

At operation 1304, the location server determines whether at least one second mobile device is within a threshold distance of at least one position of the first set of positions. In an aspect, operation 1304 may be performed by the one or more network transceivers 390, the one or more processors 394, memory 396, and/or positioning component 398, any or all of which may be considered means for performing this operation.

At operation 1306, the location server, in response to determining that the at least one second mobile device is within the threshold distance of the at least one position of the first set positions, configures the at least one second mobile device to perform positioning operations to determine the position of the first mobile device while the at least one second mobile device is within the threshold distance of the at least one position of the first set of positions. In an aspect, operation 1306 may be performed by the one or more network transceivers 390, the one or more processors 394, memory 396, and/or positioning component 398, any or all of which may be considered means for performing this operation.

As will be appreciated, a technical advantage of the method 1300 is that the location server uses a second mobile device in a scheduled determination of a position of a first mobile device at a future time. Further, the scheduled determination of the position of the first mobile device occurs when at least one second mobile device is located at a position at which GDOP considerations are optimized.

Figure 14:
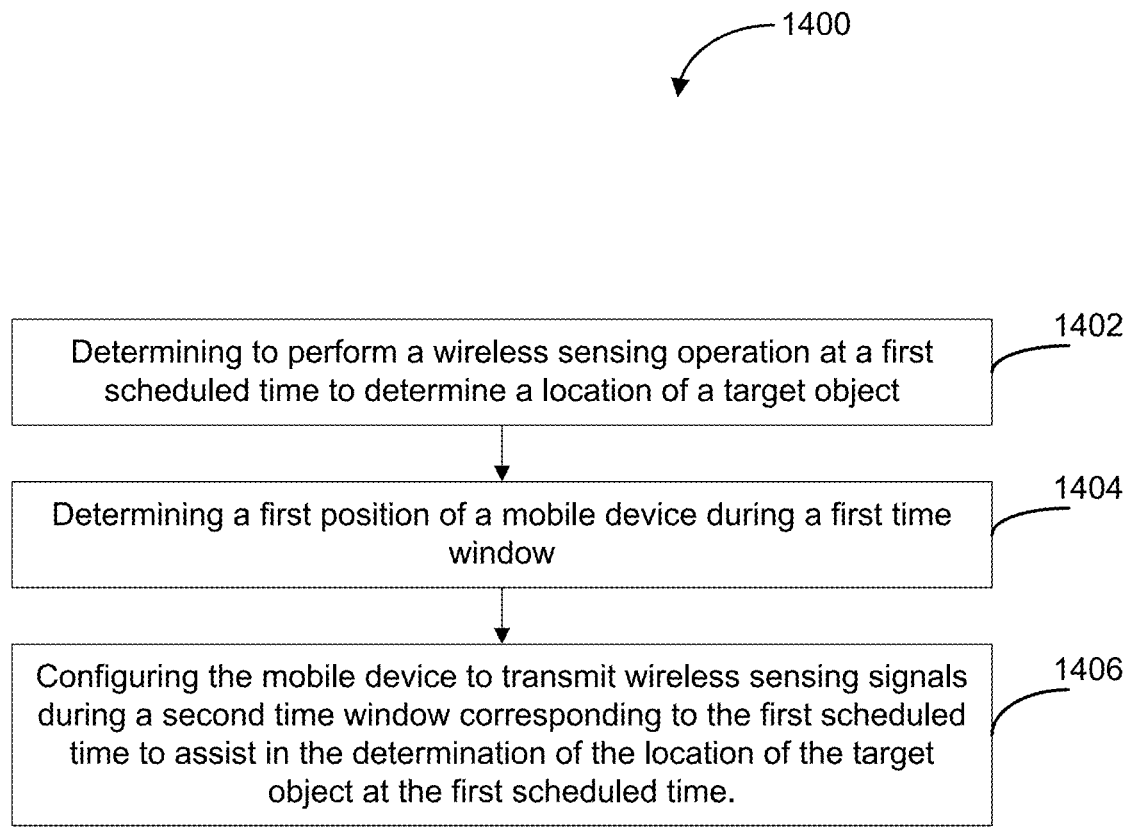
FIG. 14 illustrates an example method of wireless communication performed by a location server, according to aspects of the disclosure.

FIG. 14 illustrates an example method 1400 of wireless communication performed by a location server, according to aspects of the disclosure. At operation 1402, the location server determines to perform a wireless sensing operation at a first scheduled time to determine a location of a target object. In an aspect, operation 1402 may be performed by the one or more network transceivers 390, the one or more processors 394, memory 396, and/or positioning component 398, any or all of which may be considered means for performing this operation.

At operation 1404, the location server determines a first position of a mobile device during a first time window. In an aspect, operation 1404 may be performed by the one or more network transceivers 390, the one or more processors 394, memory 396, and/or positioning component 398, any or all of which may be considered means for performing this operation.

At operation 1406, the location server configures the mobile device to transmit wireless sensing signals during a second time window corresponding to the first scheduled time to assist in the determination of the location of the target object at the first scheduled time. In an aspect, operation 1406 may be performed by the one or more network transceivers 390, the one or more processors 394, memory 396, and/or positioning component 398, any or all of which may be considered means for performing this operation.

As will be appreciated, a technical advantage of the method 1400 is that the location server uses mobile devices in a scheduled determination of a position of a target object at a future time.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a location server, comprising: receiving a request to determine a position of a first mobile device at a first scheduled time; determining a first position of a second mobile device during a first time window; and configuring the second mobile device to perform positioning operations during a second time window corresponding to the first scheduled time to assist in a determination of the position of the first mobile device at the first scheduled time.

Clause 2. The method of clause 1, further comprising: determining the first position of the first mobile device based on measurements of one or more positioning reference signals (PRS) transmitted or received by the second mobile device during the positioning operations and the first position of the second mobile device.

Clause 3. The method of any of clauses 1 to 2, further comprising: determining a schedule indicating a second scheduled time for the first time window during which the first position of the second mobile device is to be determined.

Clause 4. The method of any of clauses 1 to 3, further comprising: receiving a tolerance for deviating from the first scheduled time; and scheduling the second time window based on the first scheduled time and the tolerance.

Clause 5. The method of clause 4, further comprising: sending a request to change the first scheduled time based on the tolerance, wherein the request to change the first scheduled time is based on the location server being unable to schedule the determination of the position of the first mobile device at the first scheduled time.

Clause 6. The method of any of clauses 1 to 5, further comprising: configuring the second time window to occur within a time threshold of the first time window, wherein the second mobile device is expected to be at the first position or within a threshold distance of the first position during the second time window.

Clause 7. The method of any of clauses 1 to 6, wherein determining the first position of the second mobile device during the first time window comprises: configuring a first set of anchor devices to perform positioning operations during the first time window to determine the first position of the second mobile device.

Clause 8. The method of clause 7, wherein: the first set of anchor devices includes fixed anchor devices at known positions.

Clause 9. The method of any of clauses 7 to 8, further comprising: determining the first set of anchor devices based, at least in part, on geometric dilution of precision (GDOP) considerations associated with known positions of the first set of anchor devices; and configuring a second set of anchor devices to perform positioning operations to determine the position of the first mobile device, wherein the second set of anchor devices includes one or more anchor devices that are different from the first set of anchor devices, wherein the second set of anchor devices is configured to perform the positioning operations to determine the position of the first mobile device during the second time window.

Clause 10. The method of clause 9, further comprising: scheduling the first time window and the second time window based on reconciliation of scheduling conflicts between positioning operations performed by the first set of anchor devices and the second set of anchor devices.

Clause 11. The method of any of clauses 9 to 10, wherein: the second set of anchor devices are fixed anchor devices at known positions.

Clause 12. The method of any of clauses 1 to 11, wherein configuring the second mobile device to perform the positioning operations comprises: configuring the second mobile device to transmit positioning reference signals (PRS) to be measured by the first mobile device during the second time window; configuring the second mobile device to measure one or more PRS received from the first mobile device during the second time window; or a combination thereof.

Clause 13. The method of clause 12, further comprising: receiving a first measurement report from the second mobile device based on measurements of the one or more PRS received by the second mobile device from the first mobile device during the second time window; receiving a second measurement report from the first mobile device based on measurements of the one or more PRS transmitted by the second mobile device during the second time window; or a combination thereof.

Clause 14. The method of any of clauses 1 to 13, wherein: the second time window is based, at least in part, on the first position of the second mobile device determined during the first time window.

Clause 15. The method of any of clauses 1 to 14, wherein: the second time window is based on a projected position of the second mobile device during the second time window, and the projected position of the second mobile device during the second time window is based on the first position of the second mobile device during the first time window.

Clause 16. The method of any of clauses 1 to 15, wherein: the second time window is further based on GDOP considerations for determining the position of the first mobile device during the second time window, and the GDOP considerations are based on an expected location of the second mobile device during the second time window and one or more known positions of one or more anchor devices used to determine the position of the first mobile device during the second time window.

Clause 17. The method of any of clauses 1 to 16, further comprising: configuring the second mobile device to move to a second position for determining the position of the first mobile device during the second time window.

Clause 18. The method of clause 17, wherein configuring the second mobile device to move to the second position comprises: sending one or more requests to one or more network entities to configure the second mobile device to move to the second position.

Clause 19. The method of any of clauses 17 to 18, wherein: the second position is determined based on GDOP considerations associated with the second position and one or more known positions of one or more anchor devices.

Clause 20. A method of wireless communication performed by a location server, comprising: determining a first set of positions for one or more second mobile devices based on geometric dilution of precision (GDOP) considerations for determining a position of a first mobile device; determining whether at least one second mobile device is within a threshold distance of at least one position of the first set of positions; and in response to determining that the at least one second mobile device is within the threshold distance of the at least one position of the first set of positions, configuring the at least one second mobile device to perform positioning operations to determine the position of the first mobile device while the at least one second mobile device is within the threshold distance of the at least one position of the first set of positions.

Clause 21. The method of clause 20, further comprising: determining that the at least one second mobile device is capable of performing the positioning operations before configuring the at least one second mobile device to perform the positioning operations.

Clause 22. The method of any of clauses 20 to 21, wherein determining that at least one second mobile device is proximate at least one position of the first set of positions comprises: receiving positioning information indicating positions of one or more second mobile devices from one or more network entities; and comparing the positioning information with the first set of positions; and determining that the second mobile device is within a threshold distance of the first set of positions.

Clause 23. The method of any of clauses 20 to 22, further comprising: configuring one or more second mobile devices to move to one or more of the first set of positions.

Clause 24. The method of clause 23, wherein configuring the one or more second mobile devices to move to the one or more of the first set of positions comprises: sending a request to one or more network entities to request the one or more network entities to configure the one or more second mobile devices to move to one or more of the first set of positions.

Clause 25. The method of clause 24, further comprising: receiving a confirmation message from at least one network entity of the one or more network entities indicating that at least one second mobile device has moved to at least one position of the first set of one or more positions.

Clause 26. The method of clause 25, wherein: the confirmation message further indicates an identity of the at least one second mobile device that has moved to the at least one position of the first set of one or more positions.

Clause 27. A method of wireless communication performed by a location server, comprising: determining to perform a wireless sensing operation at a first scheduled time to determine a location of a target object; determining a first position of a mobile device during a first time window; and configuring the mobile device to transmit wireless sensing signals during a second time window corresponding to the first scheduled time to assist in the determination of the location of the target object at the first scheduled time.

Clause 28. The method of clause 27, further comprising: determining the position of the target object based on measurements of the wireless sensing signals by a receiver device and the first position of the mobile device.

Clause 29. The method of any of clauses 27 to 28, wherein: the determining the first position of the mobile device at the first scheduled time is based on a request received by the location server.

Clause 30. A location server, comprising: a memory; at least one transceiver; and at least one processor communicatively coupled to the memory and the at least one transceiver, the at least one processor configured to: receive, via the at least one transceiver, a request to determine a position of a first mobile device at a first scheduled time; determine a first position of a second mobile device during a first time window; and configure the second mobile device to perform positioning operations during a second time window corresponding to the first scheduled time to assist in a determination of the position of the first mobile device at the first scheduled time.

Clause 31. The location server of clause 30, wherein the at least one processor is further configured to: determine the first position of the first mobile device based on measurements of one or more positioning reference signals (PRS) transmitted or received by the second mobile device during the positioning operations and the first position of the second mobile device.

Clause 32. The location server of any of clauses 30 to 31, wherein the at least one processor is further configured to: determine a schedule indicating a second scheduled time for the first time window during which the first position of the second mobile device is to be determined.

Clause 33. The location server of any of clauses 30 to 32, wherein the at least one processor is further configured to: receive, via the at least one transceiver, a tolerance for deviating from the first scheduled time; and schedule the second time window based on the first scheduled time and the tolerance.

Clause 34. The location server of clause 33, wherein the at least one processor is further configured to: send, via the at least one transceiver, a request to change the first scheduled time based on the tolerance, wherein the request to change the first scheduled time is based on the location server being unable to schedule the determination of the position of the first mobile device at the first scheduled time.

Clause 35. The location server of any of clauses 30 to 34, wherein the at least one processor is further configured to: configure the second time window to occur within a time threshold of the first time window, wherein the second mobile device is expected to be at the first position or within a threshold distance of the first position during the second time window.

Clause 36. The location server of any of clauses 30 to 35, wherein the at least one processor configured to determine the first position of the second mobile device during the first time window comprises the at least one processor configured to: configure a first set of anchor devices to perform positioning operations during the first time window to determine the first position of the second mobile device.

Clause 37. The location server of clause 36, wherein: the first set of anchor devices includes fixed anchor devices at known positions.

Clause 38. The location server of any of clauses 36 to 37, wherein the at least one processor is further configured to: determine the first set of anchor devices based, at least in part, on geometric dilution of precision (GDOP) considerations associated with known positions of the first set of anchor devices; and configure a second set of anchor devices to perform positioning operations to determine the position of the first mobile device, wherein the second set of anchor devices includes one or more anchor devices that are different from the first set of anchor devices, wherein the second set of anchor devices is configured to perform the positioning operations to determine the position of the first mobile device during the second time window.

Clause 39. The location server of clause 38, wherein the at least one processor is further configured to: schedule the first time window and the second time window based on reconciliation of scheduling conflicts between positioning operations performed by the first set of anchor devices and the second set of anchor devices.

Clause 40. The location server of any of clauses 38 to 39, wherein: the second set of anchor devices are fixed anchor devices at known positions.

Clause 41. The location server of any of clauses 30 to 40, wherein the at least one processor configured to configure the second mobile device to perform the positioning operations comprises the at least one processor configured to: configure the second mobile device to transmit positioning reference signals (PRS) to be measured by the first mobile device during the second time window; configure the second mobile device to measure one or more PRS received from the first mobile device during the second time window; or a combination thereof.

Clause 42. The location server of clause 41, wherein the at least one processor is further configured to: receive, via the at least one transceiver, a first measurement report from the second mobile device based on measurements of the one or more PRS received by the second mobile device from the first mobile device during the second time window; receive, via the at least one transceiver, a second measurement report from the first mobile device based on measurements of the one or more PRS transmitted by the second mobile device during the second time window; or a combination thereof.

Clause 43. The location server of any of clauses 30 to 42, wherein: the second time window is based, at least in part, on the first position of the second mobile device determined during the first time window.

Clause 44. The location server of any of clauses 30 to 43, wherein: the second time window is based on a projected position of the second mobile device during the second time window, and the projected position of the second mobile device during the second time window is based on the first position of the second mobile device during the first time window.

Clause 45. The location server of any of clauses 30 to 44, wherein: the second time window is further based on GDOP considerations for determining the position of the first mobile device during the second time window, and the GDOP considerations are based on an expected location of the second mobile device during the second time window and one or more known positions of one or more anchor devices used to determine the position of the first mobile device during the second time window.

Clause 46. The location server of any of clauses 30 to 45, wherein the at least one processor is further configured to: configure the second mobile device to move to a second position for determining the position of the first mobile device during the second time window.

Clause 47. The location server of clause 46, wherein the at least one processor configured to configure the second mobile device to move to the second position comprises the at least one processor configured to: send, via the at least one transceiver, one or more requests to one or more network entities to configure the second mobile device to move to the second position.

Clause 48. The location server of any of clauses 46 to 47, wherein: the second position is determined based on GDOP considerations associated with the second position and one or more known positions of one or more anchor devices.

Clause 49. A location server, comprising: a memory; at least one transceiver; and at least one processor communicatively coupled to the memory and the at least one transceiver, the at least one processor configured to: determine a first set of positions for one or more second mobile devices based on geometric dilution of precision (GDOP) considerations for determining a position of a first mobile device; determine whether at least one second mobile device is within a threshold distance of at least one position of the first set of positions; and in response to a determination that the at least one second mobile device is within the threshold distance of the at least one position of the first set of positions, configure the at least one second mobile device to perform positioning operations to determine the position of the first mobile device while the at least one second mobile device is within the threshold distance of the at least one position of the first set of positions.

Clause 50. The location server of clause 49, wherein the at least one processor is further configured to: determine that the at least one second mobile device is capable of performing the positioning operations before the at least one second mobile device is configured to perform the positioning operations.

Clause 51. The location server of any of clauses 49 to 50, wherein the at least one processor configured to determine that at least one second mobile device is proximate at least one position of the first set of positions comprises the at least one processor configured to: receive, via the at least one transceiver, positioning information indicating positions of one or more second mobile devices from one or more network entities; and compare the positioning information with the first set of positions; and determine that the second mobile device is within a threshold distance of the first set of positions.

Clause 52. The location server of any of clauses 49 to 51, wherein the at least one processor is further configured to: configure one or more second mobile devices to move to one or more of the first set of positions.

Clause 53. The location server of clause 52, wherein the at least one processor configured to configure the one or more second mobile devices to move to the one or more of the first set of positions comprises the at least one processor configured to: send, via the at least one transceiver, a request to one or more network entities to request the one or more network entities to configure the one or more second mobile devices to move to one or more of the first set of positions.

Clause 54. The location server of clause 53, wherein the at least one processor is further configured to: receive, via the at least one transceiver, a confirmation message from at least one network entity of the one or more network entities indicating that at least one second mobile device has moved to at least one position of the first set of one or more positions.

Clause 55. The location server of clause 54, wherein: the confirmation message further indicates an identity of the at least one second mobile device that has moved to the at least one position of the first set of one or more positions.

Clause 56. A location server, comprising: a memory; at least one transceiver; and at least one processor communicatively coupled to the memory and the at least one transceiver, the at least one processor configured to: determine to perform a wireless sensing operation at a first scheduled time to determine a location of a target object; determine a first position of a mobile device during a first time window; and configure the mobile device to transmit wireless sensing signals during a second time window corresponding to the first scheduled time to assist in the determination of the location of the target object at the first scheduled time.

Clause 57. The location server of clause 56, wherein the at least one processor is further configured to: determine the position of the target object based on measurements of the wireless sensing signals by a receiver device and the first position of the mobile device.

Clause 58. The location server of any of clauses 56 to 57, wherein: the determination of the first position of the mobile device at the first scheduled time is based on a request received by the location server.

Clause 59. A location server, comprising: means for receiving a request to determine a position of a first mobile device at a first scheduled time; means for determining a first position of a second mobile device during a first time window; and means for configuring the second mobile device to perform positioning operations during a second time window corresponding to the first scheduled time to assist in a determination of the position of the first mobile device at the first scheduled time.

Clause 60. The location server of clause 59, further comprising: means for determining the first position of the first mobile device based on measurements of one or more positioning reference signals (PRS) transmitted or received by the second mobile device during the positioning operations and the first position of the second mobile device.

Clause 61. The location server of any of clauses 59 to 60, further comprising: means for determining a schedule indicating a second scheduled time for the first time window during which the first position of the second mobile device is to be determined.

Clause 62. The location server of any of clauses 59 to 61, further comprising: means for receiving a tolerance for deviating from the first scheduled time; and means for scheduling the second time window based on the first scheduled time and the tolerance.

Clause 63. The location server of clause 62, further comprising: means for sending a request to change the first scheduled time based on the tolerance, wherein the request to change the first scheduled time is based on the location server being unable to schedule the determination of the position of the first mobile device at the first scheduled time.

Clause 64. The location server of any of clauses 59 to 63, further comprising: means for configuring the second time window to occur within a time threshold of the first time window, wherein the second mobile device is expected to be at the first position or within a threshold distance of the first position during the second time window.

Clause 65. The location server of any of clauses 59 to 64, wherein the means for determining the first position of the second mobile device during the first time window comprises: means for configuring a first set of anchor devices to perform positioning operations during the first time window to determine the first position of the second mobile device.

Clause 66. The location server of clause 65, wherein: the first set of anchor devices includes fixed anchor devices at known positions.

Clause 67. The location server of any of clauses 65 to 66, further comprising: means for determining the first set of anchor devices based, at least in part, on geometric dilution of precision (GDOP) considerations associated with known positions of the first set of anchor devices; and means for configuring a second set of anchor devices to perform positioning operations to determine the position of the first mobile device, wherein the second set of anchor devices includes one or more anchor devices that are different from the first set of anchor devices, wherein the second set of anchor devices is configured to perform the positioning operations to determine the position of the first mobile device during the second time window.

Clause 68. The location server of clause 67, further comprising: means for scheduling the first time window and the second time window based on reconciliation of scheduling conflicts between positioning operations performed by the first set of anchor devices and the second set of anchor devices.

Clause 69. The location server of any of clauses 67 to 68, wherein: the second set of anchor devices are fixed anchor devices at known positions.

Clause 70. The location server of any of clauses 59 to 69, wherein the means for configuring the second mobile device to perform the positioning operations comprises: means for configuring the second mobile device to transmit positioning reference signals (PRS) to be measured by the first mobile device during the second time window; means for configuring the second mobile device to measure one or more PRS received from the first mobile device during the second time window; or a combination thereof.

Clause 71. The location server of clause 70, further comprising: means for receiving a first measurement report from the second mobile device based on measurements of the one or more PRS received by the second mobile device from the first mobile device during the second time window; means for receiving a second measurement report from the first mobile device based on measurements of the one or more PRS transmitted by the second mobile device during the second time window; or a combination thereof.

Clause 72. The location server of any of clauses 59 to 71, wherein: the second time window is based, at least in part, on the first position of the second mobile device determined during the first time window.

Clause 73. The location server of any of clauses 59 to 72, wherein: the second time window is based on a projected position of the second mobile device during the second time window, and the projected position of the second mobile device during the second time window is based on the first position of the second mobile device during the first time window.

Clause 74. The location server of any of clauses 59 to 73, wherein: the second time window is further based on GDOP considerations for determining the position of the first mobile device during the second time window, and the GDOP considerations are based on an expected location of the second mobile device during the second time window and one or more known positions of one or more anchor devices used to determine the position of the first mobile device during the second time window.

Clause 75. The location server of any of clauses 59 to 74, further comprising: means for configuring the second mobile device to move to a second position for determining the position of the first mobile device during the second time window.

Clause 76. The location server of clause 75, wherein the means for configuring the second mobile device to move to the second position comprises: means for sending one or more requests to one or more network entities to configure the second mobile device to move to the second position.

Clause 77. The location server of any of clauses 75 to 76, wherein: the second position is determined based on GDOP considerations associated with the second position and one or more known positions of one or more anchor devices.

Clause 78. A location server, comprising: means for determining a first set of positions for one or more second mobile devices based on geometric dilution of precision (GDOP) considerations for determining a position of a first mobile device; means for determining whether at least one second mobile device is within a threshold distance of at least one position of the first set of positions; and means for configuring the at least one second mobile device to perform positioning operations to determine the position of the first mobile device while the at least one second mobile device is within the threshold distance of the at least one position of the first set of positions.

Clause 79. The location server of clause 78, further comprising: means for determining that the at least one second mobile device is capable of performing the positioning operations before the at least one second mobile device is configured to perform the positioning operations.

Clause 80. The location server of any of clauses 78 to 79, wherein the means for determining that at least one second mobile device is proximate at least one position of the first set of positions comprises: means for receiving positioning information indicating positions of one or more second mobile devices from one or more network entities; and means for comparing the positioning information with the first set of positions; and means for determining that the second mobile device is within a threshold distance of the first set of positions.

Clause 81. The location server of any of clauses 78 to 80, further comprising: means for configuring one or more second mobile devices to move to one or more of the first set of positions.

Clause 82. The location server of clause 81, wherein the means for configuring the one or more second mobile devices to move to the one or more of the first set of positions comprises: means for sending a request to one or more network entities to request the one or more network entities to configure the one or more second mobile devices to move to one or more of the first set of positions.

Clause 83. The location server of clause 82, further comprising: means for receiving a confirmation message from at least one network entity of the one or more network entities indicating that at least one second mobile device has moved to at least one position of the first set of one or more positions.

Clause 84. The location server of clause 83, wherein: the confirmation message further indicates an identity of the at least one second mobile device that has moved to the at least one position of the first set of one or more positions.

Clause 85. A location server, comprising: means for determining to perform a wireless sensing operation at a first scheduled time to determine a location of a target object; means for determining a first position of a mobile device during a first time window; and means for configuring the mobile device to transmit wireless sensing signals during a second time window corresponding to the first scheduled time to assist in the determination of the location of the target object at the first scheduled time.

Clause 86. The location server of clause 85, further comprising: means for determining the position of the target object based on measurements of the wireless sensing signals by a receiver device and the first position of the mobile device.

Clause 87. The location server of any of clauses 85 to 86, wherein: the determining the first position of the mobile device at the first scheduled time is based on a request received by the location server.

Clause 88. A non-transitory computer-readable medium storing computer-executable instructions that, when executed by a location server, cause the location server to: receive a request to determine a position of a first mobile device at a first scheduled time; determine a first position of a second mobile device during a first time window; and configure the second mobile device to perform positioning operations during a second time window corresponding to the first scheduled time to assist in a determination of the position of the first mobile device at the first scheduled time.

Clause 89. The non-transitory computer-readable medium of clause 88, further comprising computer-executable instructions that, when executed by the location server, cause the location server to: determine the first position of the first mobile device based on measurements of one or more positioning reference signals (PRS) transmitted or received by the second mobile device during the positioning operations and the first position of the second mobile device.

Clause 90. The non-transitory computer-readable medium of any of clauses 88 to 89, further comprising computer-executable instructions that, when executed by the location server, cause the location server to: determine a schedule indicating a second scheduled time for the first time window during which the first position of the second mobile device is to be determined.

Clause 91. The non-transitory computer-readable medium of any of clauses 88 to 90, further comprising computer-executable instructions that, when executed by the location server, cause the location server to: receive a tolerance for deviating from the first scheduled time; and schedule the second time window based on the first scheduled time and the tolerance.

Clause 92. The non-transitory computer-readable medium of clause 91, further comprising computer-executable instructions that, when executed by the location server, cause the location server to: send a request to change the first scheduled time based on the tolerance, wherein the request to change the first scheduled time is based on the location server being unable to schedule the determination of the position of the first mobile device at the first scheduled time.

Clause 93. The non-transitory computer-readable medium of any of clauses 88 to 92, further comprising computer-executable instructions that, when executed by the location server, cause the location server to: configure the second time window to occur within a time threshold of the first time window, wherein the second mobile device is expected to be at the first position or within a threshold distance of the first position during the second time window.

Clause 94. The non-transitory computer-readable medium of any of clauses 88 to 93, wherein the computer-executable instructions that, when executed by the location server, cause the location server to determine the first position of the second mobile device during the first time window comprise computer-executable instructions that, when executed by the location server, cause the location server to: configure a first set of anchor devices to perform positioning operations during the first time window to determine the first position of the second mobile device.

Clause 95. The non-transitory computer-readable medium of clause 94, wherein: the first set of anchor devices includes fixed anchor devices at known positions.

Clause 96. The non-transitory computer-readable medium of any of clauses 94 to 95, further comprising computer-executable instructions that, when executed by the location server, cause the location server to: determine the first set of anchor devices based, at least in part, on geometric dilution of precision (GDOP) considerations associated with known positions of the first set of anchor devices; and configure a second set of anchor devices to perform positioning operations to determine the position of the first mobile device, wherein the second set of anchor devices includes one or more anchor devices that are different from the first set of anchor devices, wherein the second set of anchor devices is configured to perform the positioning operations to determine the position of the first mobile device during the second time window.

Clause 97. The non-transitory computer-readable medium of clause 96, further comprising computer-executable instructions that, when executed by the location server, cause the location server to: schedule the first time window and the second time window based on reconciliation of scheduling conflicts between positioning operations performed by the first set of anchor devices and the second set of anchor devices.

Clause 98. The non-transitory computer-readable medium of any of clauses 96 to 97, wherein: the second set of anchor devices are fixed anchor devices at known positions.

Clause 99. The non-transitory computer-readable medium of any of clauses 88 to 98, wherein the computer-executable instructions that, when executed by the location server, cause the location server to configure the second mobile device to perform the positioning operations comprise computer-executable instructions that, when executed by the location server, cause the location server to: configure the second mobile device to transmit positioning reference signals (PRS) to be measured by the first mobile device during the second time window; configure the second mobile device to measure one or more PRS received from the first mobile device during the second time window; or a combination thereof.

Clause 100. The non-transitory computer-readable medium of clause 99, further comprising computer-executable instructions that, when executed by the location server, cause the location server to: receive a first measurement report from the second mobile device based on measurements of the one or more PRS received by the second mobile device from the first mobile device during the second time window; receive a second measurement report from the first mobile device based on measurements of the one or more PRS transmitted by the second mobile device during the second time window; or a combination thereof.

Clause 101. The non-transitory computer-readable medium of any of clauses 88 to 100, wherein: the second time window is based, at least in part, on the first position of the second mobile device determined during the first time window.

Clause 102. The non-transitory computer-readable medium of any of clauses 88 to 101, wherein: the second time window is based on a projected position of the second mobile device during the second time window, and the projected position of the second mobile device during the second time window is based on the first position of the second mobile device during the first time window.

Clause 103. The non-transitory computer-readable medium of any of clauses 88 to 102, wherein: the second time window is further based on GDOP considerations for determining the position of the first mobile device during the second time window, and the GDOP considerations are based on an expected location of the second mobile device during the second time window and one or more known positions of one or more anchor devices used to determine the position of the first mobile device during the second time window.

Clause 104. The non-transitory computer-readable medium of any of clauses 88 to 103, further comprising computer-executable instructions that, when executed by the location server, cause the location server to: configure the second mobile device to move to a second position for determining the position of the first mobile device during the second time window.

Clause 105. The non-transitory computer-readable medium of clause 104, wherein the computer-executable instructions that, when executed by the location server, cause the location server to configure the second mobile device to move to the second position comprise computer-executable instructions that, when executed by the location server, cause the location server to: send one or more requests to one or more network entities to configure the second mobile device to move to the second position.

Clause 106. The non-transitory computer-readable medium of any of clauses 104 to 105, wherein: the second position is determined based on GDOP considerations associated with the second position and one or more known positions of one or more anchor devices.

Clause 107. A non-transitory computer-readable medium storing computer-executable instructions that, when executed by a location server, cause the location server to: determine a first set of positions for one or more second mobile devices based on geometric dilution of precision (GDOP) considerations for determining a position of a first mobile device; determine whether at least one second mobile device is within a threshold distance of at least one position of the first set of positions; and in response to a determination that the at least one second mobile device is within the threshold distance of the at least one position of the first set of positions, configure the at least one second mobile device to perform positioning operations to determine the position of the first mobile device while the at least one second mobile device is within the threshold distance of the at least one position of the first set of positions.

Clause 108. The non-transitory computer-readable medium of clause 107, further comprising computer-executable instructions that, when executed by the location server, cause the location server to: determine that the at least one second mobile device is capable of performing the positioning operations before the at least one second mobile device is configured to perform the positioning operations.

Clause 109. The non-transitory computer-readable medium of any of clauses 107 to 108, wherein the computer-executable instructions that, when executed by the location server, cause the location server to determine that at least one second mobile device is proximate at least one position of the first set of positions comprise computer-executable instructions that, when executed by the location server, cause the location server to: receive positioning information indicating positions of one or more second mobile devices from one or more network entities; and compare the positioning information with the first set of positions; and determine that the second mobile device is within a threshold distance of the first set of positions.

Clause 110. The non-transitory computer-readable medium of any of clauses 107 to 109, further comprising computer-executable instructions that, when executed by the location server, cause the location server to: configure one or more second mobile devices to move to one or more of the first set of positions.

Clause 111. The non-transitory computer-readable medium of clause 110, wherein the computer-executable instructions that, when executed by the location server, cause the location server to configure the one or more second mobile devices to move to the one or more of the first set of positions comprise computer-executable instructions that, when executed by the location server, cause the location server to: send a request to one or more network entities to request the one or more network entities to configure the one or more second mobile devices to move to one or more of the first set of positions.

Clause 112. The non-transitory computer-readable medium of clause 111, further comprising computer-executable instructions that, when executed by the location server, cause the location server to: receive a confirmation message from at least one network entity of the one or more network entities indicating that at least one second mobile device has moved to at least one position of the first set of one or more positions.

Clause 113. The non-transitory computer-readable medium of clause 112, wherein: the confirmation message further indicates an identity of the at least one second mobile device that has moved to the at least one position of the first set of one or more positions.

Clause 114. A non-transitory computer-readable medium storing computer-executable instructions that, when executed by a location server, cause the location server to: determine to perform a wireless sensing operation at a first scheduled time to determine a location of a target object; determine a first position of a mobile device during a first time window; and configure the mobile device to transmit wireless sensing signals during a second time window corresponding to the first scheduled time to assist in the determination of the location of the target object at the first scheduled time.

Clause 115. The non-transitory computer-readable medium of clause 114, further comprising computer-executable instructions that, when executed by the location server, cause the location server to: determine the position of the target object based on measurements of the wireless sensing signals by a receiver device and the first position of the mobile device.

Clause 116. The non-transitory computer-readable medium of any of clauses 114 to 115, wherein: the determining the first position of the mobile device at the first scheduled time is based on a request received by the location server.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a location server, comprising:
    determining a first set of positions for one or more second mobile devices based on geometric dilution of precision (GDOP) considerations for determining a position of a first mobile device;
    determining whether at least one second mobile device is within a threshold distance of at least one position of the first set of positions; and
    in response to determining that the at least one second mobile device is within the threshold distance of the at least one position of the first set of positions,
    configuring the at least one second mobile device to perform positioning operations to determine the position of the first mobile device while the at least one second mobile device is within the threshold distance of the at least one position of the first set of positions.

2. The method of claim 1, further comprising:
    determining that the at least one second mobile device is capable of performing the positioning operations before configuring the at least one second mobile device to perform the positioning operations.

3. The method of claim 1, wherein determining that at least one second mobile device is proximate at least one position of the first set of positions comprises:
    receiving positioning information indicating positions of one or more second mobile devices from one or more network entities; and
    comparing the positioning information with the first set of positions; and
    determining that the second mobile device is within a threshold distance of the first set of positions.

4. The method of claim 1, further comprising:
    configuring one or more second mobile devices to move to one or more of the first set of positions.

5. The method of claim 4, wherein configuring the one or more second mobile devices to move to the one or more of the first set of positions comprises:
    sending a request to one or more network entities to request the one or more network entities to configure the one or more second mobile devices to move to one or more of the first set of positions.

6. The method of claim 5, further comprising:
    receiving a confirmation message from at least one network entity of the one or more network entities indicating that at least one second mobile device has moved to at least one position of the first set of one or more positions.

7. The method of claim 6, wherein:
    the confirmation message further indicates an identity of the at least one second mobile device that has moved to the at least one position of the first set of one or more positions.

8. A method of wireless communication performed by a location server, comprising:
    receiving a request to determine a position of a first mobile device at a first scheduled time;
    determining a first position of a second mobile device during a first time window; and
    configuring the second mobile device to perform positioning operations during a second time window corresponding to the first scheduled time to assist in a determination of the position of the first mobile device at the first scheduled time;
    receiving a tolerance for deviating from the first scheduled time;
    scheduling the second time window based on the first scheduled time and the tolerance; and
    sending a request to change the first scheduled time based on the tolerance, wherein the request to change the first scheduled time is based on the location server being unable to schedule the determination of the position of the first mobile device at the first scheduled time.

9. A method of wireless communication performed by a location server, comprising:
    receiving a request to determine a position of a first mobile device at a first scheduled time;
    determining a first set of anchor devices based, at least in part, on geometric dilution of precision (GDOP) considerations associated with known positions of the first set of anchor devices;
    configuring the first set of anchor devices to perform positioning operations during a first time window to determine a first position of a second mobile device, wherein the first set of anchor devices is determined based, at least in part, on geometric dilution of precision (GDOP) considerations associated with known positions of the first set of anchor devices;
    determining a first position of the second mobile device during the first time window; and
    configuring a second set of anchor devices to perform positioning operations to determine the position of the first mobile device, wherein the second set of anchor devices includes one or more anchor devices that are different from the first set of anchor devices, wherein the second set of anchor devices is configured to perform the positioning operations to determine the position of the first mobile device during a second time window corresponding to the first scheduled time to assist in a determination of the position of the first mobile device at the first scheduled time.

10. The method of claim 9, further comprising:
    scheduling the first time window and the second time window based on reconciliation of scheduling conflicts between positioning operations performed by the first set of anchor devices and the second set of anchor devices.

11. The method of claim 9, wherein:
the second set of anchor devices are fixed anchor devices at known positions.

12. A method of wireless communication performed by a location server, comprising:
receiving a request to determine a position of a first mobile device at a first scheduled time;
determining a first position of a second mobile device during a first time window;
configuring the second mobile device to perform positioning operations during a second time window corresponding to the first scheduled time to assist in a determination of the position of the first mobile device at the first scheduled time, wherein configuring the second mobile device to perform the positioning operations comprises
configuring the second mobile device to transmit positioning reference signals (PRS) to be measured by the first mobile device during the second time window,
configuring the second mobile device to measure one or more PRS received from the first mobile device during the second time window; or
a combination thereof, and
the method further comprising
receiving a first measurement report from the second mobile device based on measurements of the one or more PRS received by the second mobile device from the first mobile device during the second time window,
receiving a second measurement report from the first mobile device based on measurements of the one or more PRS transmitted by the second mobile device during the second time window, or
a combination thereof.

13. A method of wireless communication performed by a location server, comprising:
receiving a request to determine a position of a first mobile device at a first scheduled time;
determining a first position of a second mobile device during a first time window;
configuring the second mobile device to perform positioning operations during a second time window corresponding to the first scheduled time to assist in a determination of the position of the first mobile device at the first scheduled time, wherein the second time window is further based on geometric dilution of precision (GDOP) considerations for determining the position of the first mobile device during the second time window; and
the GDOP considerations are based on an expected location of the second mobile device during the second time window and one or more known positions of one or more anchor devices used to determine the position of the first mobile device during the second time window.

14. A method of wireless communication performed by a location server, comprising:
determining a first set of positions for one or more second mobile devices based on geometric dilution of precision (GDOP) considerations for determining a position of a first mobile device;
configuring one or more second mobile devices to move to one or more of the first set of positions wherein configuring the one or more second mobile devices to move to the one or more of the first set of positions comprises sending a request to one or more network entities to request the one or more network entities to configure the one or more second mobile devices to move to one or more of the first set of positions, and receiving a confirmation message from at least one network entity of the one or more network entities indicating that at least one second mobile device has moved to at least one position of the first set of one or more positions;
determining whether at least one second mobile device is within a threshold distance of at least one position of the first set of positions; and
in response to determining that the at least one second mobile device is within the threshold distance of the at least one position of the first set of positions,
configuring the at least one second mobile device to perform positioning operations to determine the position of the first mobile device while the at least one second mobile device is within the threshold distance of the at least one position of the first set of positions.

15. The method of claim 14, wherein:
the confirmation message further indicates an identity of the at least one second mobile device that has moved to the at least one position of the first set of one or more positions.

* * * * *